(12) United States Patent  
Saleh et al.

(10) Patent No.: US 8,897,618 B1
(45) Date of Patent: *Nov. 25, 2014

(54) DOCTOR TO PATIENT MULTIMEDIA SYNTHESIS COMMUNICATION

(71) Applicant: Trisynergy Media Corp., Lake Oswego, OR (US)

(72) Inventors: Mohammad Saleh, West Linn, OR (US); Al Tabayoyon, Tigard, OR (US); Scott LaRocca, Altadena, CA (US)

(73) Assignee: Trisynergy Media Corp., Lake Oswego, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 14/139,843

(22) Filed: Dec. 23, 2013

Related U.S. Application Data

(63) Continuation of application No. 13/410,139, filed on Mar. 1, 2012, now Pat. No. 8,631,073.

(51) Int. Cl.
*H04N 9/80* (2006.01)
*G11B 27/02* (2006.01)
*G06F 15/16* (2006.01)

(52) U.S. Cl.
CPC ........................... *G11B 27/02* (2013.01)
USPC ........... 386/241; 386/239; 386/240; 709/204; 709/205; 709/206; 709/207

(58) Field of Classification Search
USPC ......... 709/204, 205, 206, 207; 379/10.03, 71; 386/239, 240, 241
See application file for complete search history.

(56) References Cited

U.S. PATENT DOCUMENTS

| | | | |
|---|---|---|---|
| 6,175,859 B1 | 1/2001 | Mohler | |
| 6,865,260 B1 | 3/2005 | Meadows et al. | |
| 7,117,245 B1 | 10/2006 | Levkoff et al. | |
| 7,237,268 B2* | 6/2007 | Fields | 726/27 |
| 7,886,327 B2 | 2/2011 | Stevens | |
| 8,040,880 B2 | 10/2011 | Bettis et al. | |
| 8,200,766 B2 | 6/2012 | Yang et al. | |
| 8,369,841 B2 | 2/2013 | Kobylarz | |
| 8,457,661 B2 | 6/2013 | Rossano et al. | |
| 2003/0092972 A1* | 5/2003 | Mantilla et al. | 600/300 |
| 2003/0191816 A1 | 10/2003 | Landress et al. | |
| 2006/0107056 A1 | 5/2006 | Bhatt et al. | |
| 2008/0182560 A1 | 7/2008 | Beije | |
| 2009/0156170 A1* | 6/2009 | Rossano et al. | 455/412.1 |

(Continued)

OTHER PUBLICATIONS

U.S. Appl. No. 61/525,635; "Design, Creation, and Delivery of Personalized Message/Audio-Video Content;" Prepared by Jason S. Feldmar, Gates & Cooper LLP, Los Angeles, CA; Inventors: Frankel, et al.; filed Aug. 19, 2011.

*Primary Examiner* — Daquan Zhao
(74) *Attorney, Agent, or Firm* — Law Office of Karen Dana Oster, LLC

(57) ABSTRACT

A method of recording an audio visual asset using a predetermined script is disclosed. The audio visual asset may be partitioned into multiple audio visual segments and the audio visual segments may be edited by the application of a naming paradigm and/or a data tagging system. The audio visual segments may then be overlaid with audio visual variables. The audio visual segments may be compiled by uploading the audio visual segments into a multimedia synthesis compiler such that a variable final message compilation may be generated. A user may be messaged by selecting a message type from the variable final message compilation generated from the audio visual segments.

20 Claims, 27 Drawing Sheets

(56) References Cited

U.S. PATENT DOCUMENTS

| | | |
|---|---|---|
| 2009/0319268 A1 | 12/2009 | Aumont et al. |
| 2010/0063892 A1 | 3/2010 | Keronen |
| 2010/0121926 A1 | 5/2010 | Catalano |
| 2010/0138232 A1 | 6/2010 | Ryan et al. |
| 2011/0075990 A1 | 3/2011 | Eyer |
| 2011/0173072 A1 | 7/2011 | Ross et al. |
| 2013/0046781 A1 | 2/2013 | Frankel et al. |
| 2013/0204704 A1 | 8/2013 | Ross et al. |

* cited by examiner

| POSITION 1 | POSITION 2 | POSITION 3 | POSITION 4 | POSITION 5 | POSITION 6 | POSITION 7 | POSITION 8 | POSITION 9 | POSITION 10 |
|---|---|---|---|---|---|---|---|---|---|
| RECIPIENT NAME | SENDER NAME | INTRO. MESSAGE | DATE DAY | DATE MONTH | DATE NUMBER | DATE TIME | DATE PERIOD | OPEN SLOT (OPTIONAL) | ENDING |
| 702 DIALOGUE CAPTIONS | 2 DIALOGUE CAPTIONS | 4 DIALOGUE CAPTIONS | 8 DIALOGUE CAPTIONS | 12 DIALOGUE CAPTIONS | 31 DIALOGUE CAPTIONS | 72 DIALOGUE CAPTIONS | 3 DIALOGUE CAPTIONS | 1 DIALOGUE CAPTIONS | 4 DIALOGUE CAPTIONS |
| 702 NAMES EXAMPLE: JOHN<br><br>1 NICKNAME<br>1.) HELLO THERE | 1.) THIS IS DOCTOR REYNOLDS YOUR DENTIST<br><br>2.) THIS IS DOCTOR REYNOLDS FROM DENTAL DYNAMICS YOUR DENTIST | 1.) I'D LIKE TO TAKE THE TIME TO REMIND YOU OF YOUR DENTAL PROCEDURE APPOINTMENT WITH ME<br><br>2.) I'D LIKE TO TAKE THE TIME TO WELCOME YOU TO OUR PRACTICE AND REMIND YOU OF YOUR APPOINTMENT WITH ME<br><br>3.) I'D LIKE TO TAKE THE TIME TO REMIND YOU OF YOUR DENTAL CHECKUP AND CLEANING APPOINTMENT WITH ME<br><br>4.) I'D LIKE TO TAKE THE TIME TO REMIND YOU OF YOUR PERIODONTAL TREATMENT APPOINTMENT | 1.) MONDAY<br>2.) TUESDAY<br>3.) WEDNESDAY<br>4.) THURSDAY<br>5.) FRIDAY<br>6.) SATURDAY<br>7.) SUNDAY<br>8.) TOMORROW | 1.) JANUARY<br>2.) FEBRUARY<br>3.) MARCH<br>4.) APRIL<br>5.) MAY<br>6.) JUNE<br>7.) JULY<br>8.) AUGUST<br>9.) SEPTEMBER<br>10.) OCTOBER<br>11.) NOVEMBER<br>12.) DECEMBER | 1.) THE 1ST<br>2.) THE 2ND<br>3.) THE 3RD<br>4.) THE 4TH<br>5.) THE 5TH<br>6.) THE 6TH<br>7.) THE 7TH<br>8.) THE 8TH<br>9.) THE 9TH<br>10.) THE 10TH<br>11.) THE 11TH<br>12.) THE 12TH<br>13.) THE 13TH<br>14.) THE 14TH<br>15.) THE 15TH<br>16.) THE 16TH<br>17.) THE 17TH<br>18.) THE 18TH<br>19.) THE 19TH<br>20.) THE 20TH<br>21.) THE 21ST<br>22.) THE 22ND<br>23.) THE 23RD<br>24.) THE 24TH<br>25.) THE 25TH<br>26.) THE 26TH<br>27.) THE 27TH<br>28.) THE 28TH<br>29.) THE 29TH<br>30.) THE 30TH<br>31.) THE 31ST | 1.) AT 6 OCLOCK<br>2.) AT 6:10<br>3.) AT 6:20<br>4.) AT 6:30<br>5.) AT 6:40<br>6.) AT 6:50<br>7.) AT 7 OCLOCK<br>8.) AT 7:10<br>9.) AT 7:20<br>10.) AT 7:30<br>11.) AT 7:40<br>12.) AT 7:50<br>13.) AT 8 OCLOCK<br>14.) AT 8:10<br>15.) AT 8:20<br>16.) AT 8:30<br>17.) AT 8:40<br>18.) AT 8:50<br>19.) AT 9 OCLOCK<br>20.) AT 9:10<br>21.) AT 9:20<br>22.) AT 9:30<br>23.) AT 9:40<br>24.) AT 9:50<br>25.) AT 10 OCLOCK<br>26.) AT 10:10<br>27.) AT 10:20<br>28.) AT 10:30<br>29.) AT 10:40<br>30.) AT 10:50<br>31.) AT 11 OCLOCK<br>32.) AT 11:10<br>33.) AT 11:20<br>34.) AT 11:30<br>35.) AT 11:40<br>36.) AT 11:50<br>37.) AT 12 OCLOCK<br>38.) AT 12:10<br>39.) AT 12:20<br>40.) AT 12:30<br>41.) AT 12:40<br>42.) AT 12:50<br>43.) AT 1 OCLOCK<br>44.) AT 1:10<br>45.) AT 1:20<br>46.) AT 1:30<br>47.) AT 1:40<br>48.) AT 1:50<br>49.) AT 2 OCLOCK<br>50.) AT 2:10<br>51.) AT 2:20<br>52.) AT 2:30<br>53.) AT 2:40<br>54.) AT 2:50<br>55.) AT 3 OCLOCK<br>56.) AT 3:10<br>57.) AT 3:20<br>58.) AT 3:30<br>59.) AT 3:40<br>60.) AT 3:50<br>61.) AT 4 OCLOCK<br>62.) AT 4:10<br>63.) AT 4:20<br>64.) AT 4:30<br>65.) AT 4:40<br>66.) AT 4:50<br>67.) AT 5 OCLOCK<br>68.) AT 5:10<br>69.) AT 5:20<br>70.) AT 5:30<br>71.) AT 5:40<br>72.) AT 5:50 | 1.) IN THE MORNING<br>2.) IN THE AFTERNOON<br>3.) IN THE EVENING | 1.) I HAVE RESERVED A BLOCK OF TIME EXCLUSIVELY FOR YOU<br><br>2.) NONE (OPTION) | 1.) I LOOK FORWARD TO SEEING YOU. HAVE A GREAT DAY<br><br>2.) I LOOK FORWARD TO SEEING YOU AT THAT TIME. HAVE A GREAT DAY<br><br>3.) I LOOK FORWARD TO SEEING YOU AT THAT TIME.<br><br>4.) I LOOK FORWARD TO SEEING YOU THEN |

PREDEFINED SCRIPT VIEW 300

FIGURE 3

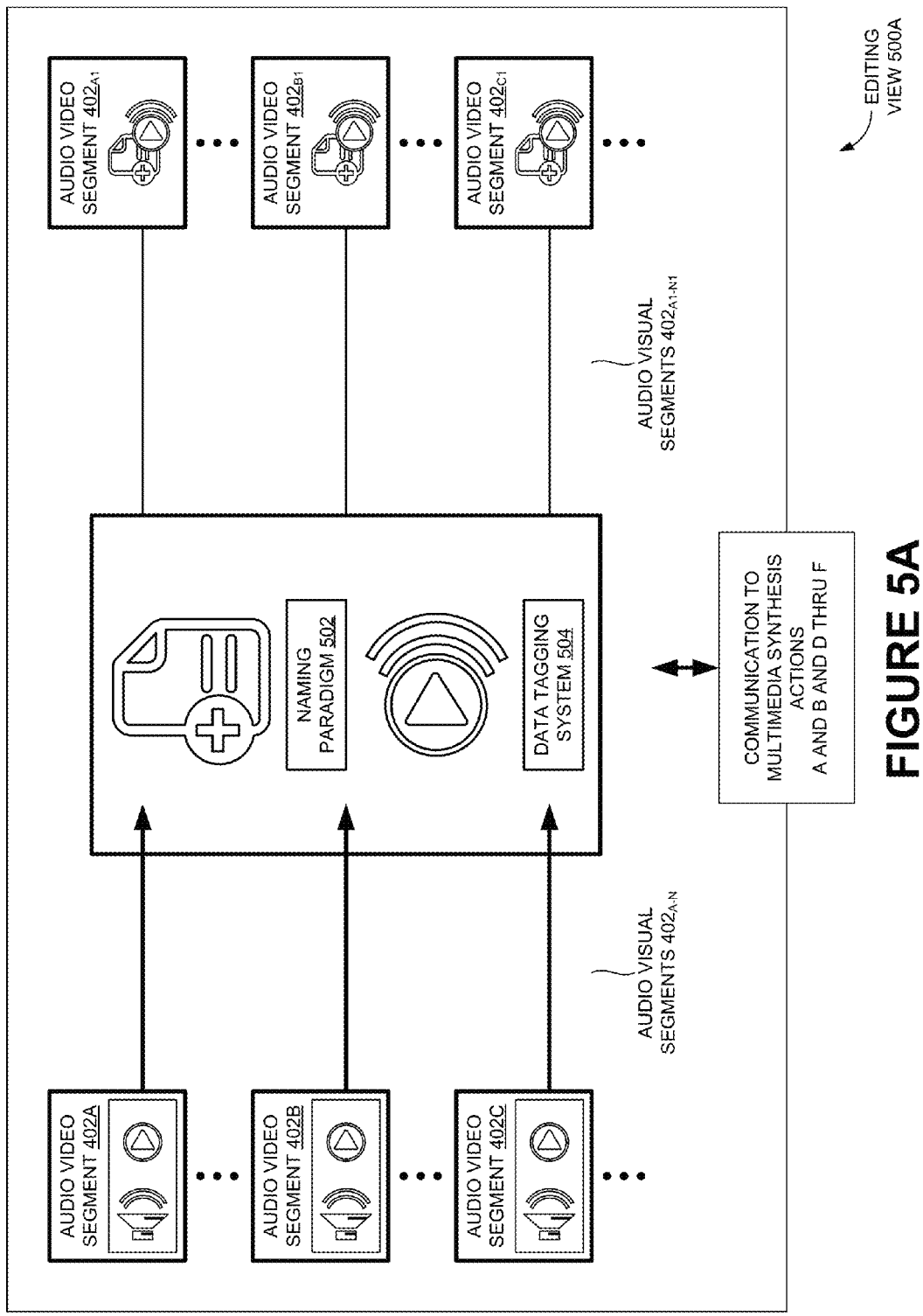

FIGURE 13F

DOCTOR TO PATIENT MULTIMEDIA SYNTHESIS COMMUNICATION

The present application is an application claiming the benefit of U.S. patent application Ser. No. 13/410,139, filed Mar. 1, 2012. The present application is based on and claims priority from this application, the disclosure of which is hereby expressly incorporated herein by reference in its entirety.

BACKGROUND OF THE INVENTION

Communication between a doctor and a patient is of crucial importance in the medical field. Consistent, reliable, secure, trustworthy and seamless communication between a doctor and his/her patient may save lives, improve patient care and decrease healthcare costs. In the healthcare field, patients prefer hearing from and communicating directly with his/her doctor, dentist, and/or other healthcare professional. The intimacy associated with personal communications between a healthcare professional and his/her patient may add to the merits of patient care and may provide better treatment options and outcomes.

Currently, there exists a problem in the healthcare field wherein missed appointments may negatively affect the revenue of a medical practice and may reduce the consistency and quality of care provided to patients. The U.S. Department of Labor estimates that there are over 1.5 million healthcare professionals, particularly doctors, in the United States. The average lost revenue due to missed appointments in a medical practice may be twenty percent (20%) or about $125,000.00. Similarly, the average lost revenue due to missed appointments in a dental practice may be between eighteen percent (18%) and twenty two percent (22%) or about $138,000.00.

Existing solutions to reduce missed appointments may not be effective. The appointment reminder task is currently carried out by the least respected person in a medical office. The receptionist may make collection calls, may ask for payments and co-payments, may handle billing, may inform patients of pricing estimates, may inform patients of the services that may not be covered by their insurance policy, may impose late fees on patients, and may impose late appointment cancellation fees. In terms of the degree of respect that patients have for workers in the healthcare industry, doctors and dentists rank the highest followed by nurse practitioners, hygienists, nurses, and dental assistants, with receptionists being at the bottom, partly due to the tasks they are required to carry out as part of their daily responsibilities. Therefore, the appointment setting and reminder function is not a prudent task for a receptionist to carry out.

A doctor's involvement with the appointment setting and reminder task may prove beneficial. Doctors command respect from all corners of the globe and across all income levels. Doctors have a direct impact on a patient's life because they advise patients on their health, and save lives with surgery and treatments. In recent years, the number of newly trained doctors has declined. With the baby boomer generation set to retire, there has never been a greater need for more doctors. The high level of education required to practice medicine successfully, coupled with higher salaries, puts doctors at the top of the list of respected professionals.

Current practices to reduce missed appointments include canned appointment reminders utilizing existing methods such as postal mail, text messages, electronic mail, and telephone calls. Existing methods require proper verbiage when calling patients, reconfirmation and follow up of appointments, late cancellation charges for missed appointments, taking deposits for certain appointments, and most importantly, medical and clinical staff involvement in patient education and placing value and/or urgency on the importance of appointments. Presently, appointment reminder tasks and calls are handled by non-clinical staff and/or receptionists. As discussed above, the appointment setting and reminder function is not a prudent task for a receptionist to carry out, and a doctor's involvement in this process may be advantageous.

The impact of missed appointments cannot be ignored. Missed appointments may potentially affect a patient's health through interrupted continuity of care and/or missed opportunities to solve an acute health problem. A doctor may also lose an opportunity for a timely review of a patient's health, treatment progress, etc. Missed appointments may also disrupt the healthcare system. The care of other patients may become postponed and these patients may not have access to care. There may also be a liability risk that may arise from missed appointments. A patient that misses an appointment may suffer an injury, and may have a viable cause of action in a lawsuit against a doctor's medical practice. To avoid such risk, a doctor may have to maintain sufficient evidence of giving and/or delivering clear instructions to the patient. The doctor may also have to make reasonable efforts to ensure a patient's compliance with a care program, including keeping follow up appointments.

It will be appreciated that a medical practice may suffer lost revenue due to missed appointments. The patient may have to be called to reschedule, and the medical practice may have to undertake cumbersome documentation efforts including follow up letters. This ultimately contributes to the poor utilization of valuable and expensive medical resources and may also negatively affect the doctor-patient relationship. What is needed is a secure and reliable method and system to facilitate doctor to patient communication.

BRIEF SUMMARY OF THE INVENTION

In one aspect, the method may comprise six steps of (a) recording, (b) partitioning, (c) editing, (d) overlaying, (e) compiling, and (f) messaging. An audio visual asset may be recorded using a predetermined script organized with a plurality of line breaks such that a user may be prompted during the recording of a dialogue. The audio visual asset may be then partitioned into a plurality of audio visual segments such that a variable final message compilation may be anticipated.

The plurality of audio visual segments may be edited by applying a naming paradigm and/or a data tagging system such that the plurality of audio visual segments may be accessible by an audio visual data tag and exported to the variable final message compilation. The plurality of audio visual segments may be overlaid with a plurality of audio visual variables and the plurality of audio visual segments may be compiled by uploading the plurality of audio visual segments into a multimedia synthesis compiler such that the variable final message compilation may be generated. Finally, a user may be messaged by selecting a message type from the variable final message compilation generated from the plurality of audio visual segments.

In another aspect, the plurality of line breaks associable with the predetermined script may be defined to be aware of steps (a) through (f) (i.e., recording, partitioning, editing, overlaying, compiling, and messaging) upon occurrence of a multimedia synthesis instance. Any change to steps (a) through (f) may result in a corresponding adaptation of each individual step of (a), (b), (c), (d), (e) and (f) upon occurrence of a multimedia synthesis instance. The predefined script may be read over a recording session such that the dialogue may be prompted to be aware of steps (a) through (f) upon occurrence of a multimedia synthesis instance. In one exemplary aspect, the dialogue may be recorded based on reading of a plurality of words such that the variable final message compilation generated through the multimedia synthesis compiler may be aware of steps (a) through (f) upon occurrence of a multimedia synthesis instance.

According to one illustrative aspect, the naming paradigm that is applied to the plurality of audio visual segments may be organized based on an owner label, a voice label, a message context label, a message context attribute label, a message product type label, and/or a file type label. The data tagging system that is applied to the plurality of audio visual segments may be applied based on a context with a plurality of variations including a group, an output enabler, an output playback, a distribution channel, and/or a pricing. The overlaying of the plurality of audio visual segments with the plurality of audio visual variables may be applied based on a message type, an audio type, a video type, and/or a personalization.

The recording of the audio visual asset using the predetermined script may be performed using a microphone, an interactive voice response, and/or a doctor. The plurality of audio visual segments may be organized in a filing manner such that the plurality of audio visual segments may be aware of each other with respect to a voice, a message type, a message context, and/or multiple message types. The multi-media synthesis compiler may compile the variable final message compilation such that the variable final message compilation may be outputted in a plurality of audio visual formats. The plurality of audio visual assets may also be recorded using the predetermined script.

In an exemplary aspect, the method may also comprise a doctor and patient communication method. An audio visual asset may be recorded by a doctor using a predetermined script to communicate with a patient. A plurality of audio visual segments may be created by partitioning the audio visual asset such that a variable final message compilation may be anticipated. A naming paradigm and/or a data tagging system may be used to tag the plurality of audio visual segments such that the plurality of audio visual segments may be accessible via an audio visual data tag, and may be exported to the variable final message compilation. A multimedia synthesis compiler may compile the variable final message compilation upon uploading of the plurality of audio visual segments into the multimedia synthesis compiler. A message may be sent to the patient from the variable final message compilation based on the plurality of audio visual segments.

In one aspect, the doctor and patient communication method may comprise recording an audio visual asset using a predetermined script wherein the predetermined script may be converted into a variable final message compilation associable with a plurality of patients. The audio visual asset may be partitioned into a plurality of audio visual segments such that the variable final message compilation may be anticipated. The plurality of audio visual segments may be edited by applying a naming paradigm and/or a data tagging system such that the plurality of audio visual segments may be accessible via an audio visual data tag and may be exported to the variable final message compilation. The plurality of audio visual segments may be overlaid with a plurality of audio visual variables. The variable final message compilation may be compiled by uploading the plurality of audio visual segments into a multimedia synthesis compiler such that the variable final message compilation may be generated. Finally, a user may be messaged by selecting a message from the variable final message compilation generated from the plurality of audio visual segments.

The methods and systems disclosed herein may be implemented by any means for achieving various aspects, and may be executed in a form of a machine-readable medium embodying a set of instructions that, when executed by a machine, cause the machine to perform any of the operations disclosed herein. It will also be appreciated that the terms "audio video asset/s" and "audio video segment/s" may be used interchangeably with the terms "audio visual asset/s" and "audio visual segment/s" respectively and vice-versa. Other features will be apparent from the accompanying drawings and from the detailed description that follows.

BRIEF DESCRIPTION OF THE SEVERAL VIEWS OF THE DRAWINGS

Example embodiments are illustrated by way of example and not limitation in the figures of the accompanying drawings, in which like references indicate similar elements and in which:

FIG. 3 illustrates predefined script view 300, according to one or more exemplary embodiments.

FIGS. 5A and 5B illustrate editing views 500A and 500B, according to one or more exemplary embodiments.

FIGS. 13A through 13K illustrate various user interface views of the doctor and patient communication method, according to one or more exemplary embodiments.

Figure 1:
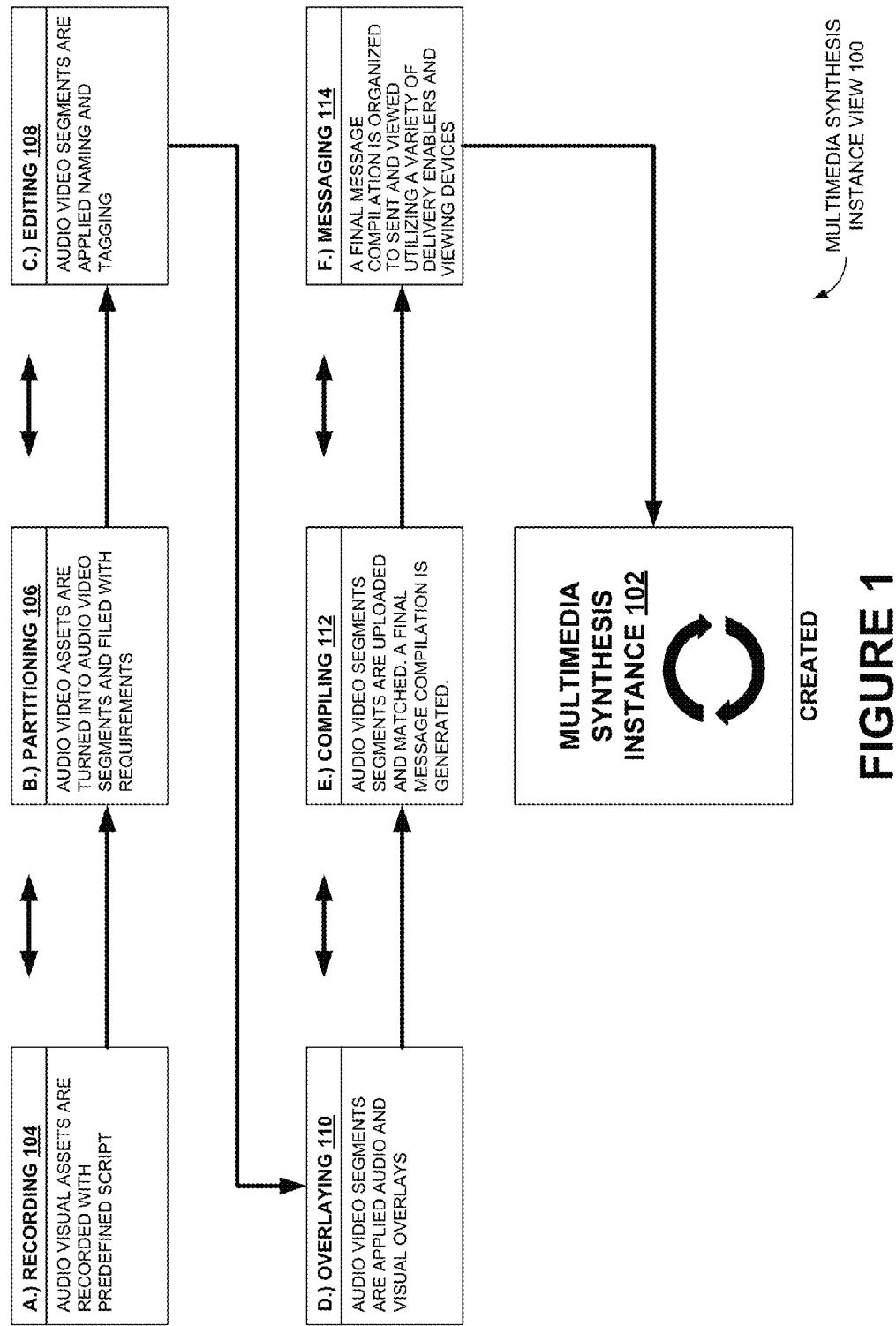
FIG. 1 illustrates a multimedia synthesis instance view 100, according to one or more exemplary embodiments.

Other features of the present embodiments will be apparent from the accompanying drawings and from the detailed description that follow.

DETAILED DESCRIPTION OF THE INVENTION

A method of comprising six steps of (a) recording 104, (b) partitioning 106, (c) editing 108, (d) overlaying 110, (e) compiling 112, and (f) messaging 114 to facilitate secure and efficient communication between two or more parties is disclosed. According to one embodiment, Step (a) may comprise recording 104 an audio visual asset 202 using a predetermined script 204 organized with a plurality of line breaks such that a user may be prompted during the recording 104 of a dialogue. The recording 104 may be performed with a recording session wherein the predetermined script 204 may be turned into multiple audio visual assets 202 A-N and multiple names (e.g., patient names). The recording 104 may be performed via phone (i.e., Interactive Voice Response), by microphone, and/or by a doctor, according to one or more embodiments.

Step (b), according to one or more embodiments, may comprise partitioning 106 the audio visual asset into a plurality of audio visual segments 402A-N such that a variable final message compilation 704 may be anticipated. According to other embodiments, Step (c) may comprise editing 108 the plurality of audio visual segments 402 A-N by applying a naming paradigm 502, and/or a data tagging system 504 such that the plurality of audio visual segments 402 A-N may be accessible by an audio visual data tag and exported to the variable final message compilation 704. The audio visual asset 202 may be sliced and labeled by applying the naming paradigm 502 and/or the data tagging system 504. Multiple audio visual assets 202 A-N may be subjected to this step, according to one embodiment. Editing 108 may be done by the application, and no human interaction may be required.

Step (d), according to one or more embodiments, may comprise overlaying 110 the plurality of audio visual segments 402 A-N with a plurality of audio visual variables. The audio visual assets 202 A-N may be prepped through a process of creatively overlaying 110 audio visual segments 402 A-N to anticipate the variable final message compilation 704. It will be appreciated that, according to one or more illustrative embodiments, Step (e) may comprise compiling 112 the plurality of audio visual segments 402 A-N by uploading the plurality of audio visual segments 402A-N into a multimedia synthesis compiler 702 such that the variable final message compilation 704 may be generated. Step (f), the final step in the method, may comprise messaging 114 a user by selecting a message type from the variable final message compilation 704 generated from the plurality of audio visual segments 402 A-N, according to one or more exemplary embodiments.

FIG. 1 illustrates a multimedia synthesis view 100, according to one or more embodiments. A multimedia synthesis instance 102 may be created. A recording 104 may comprise recording the audio visual asset 202 with a predetermined script 204. Partitioning 106 may comprise turning multiple audio visual assets 202 A-N into multiple audio visual segments 402 A-N and filing them with certain requirements, according to one embodiment. According to another embodiment, editing 108 may comprise applying the naming paradigm 502 and/or the data tagging system 504 to the audio visual segments 402 A-N. Overlaying 110, according to one embodiment, may comprise overlaying 110 the plurality of audio visual segments 402 A-N with a plurality of audio visual variables. Compiling 112, according to one embodiment, may comprise uploading and matching the audio visual segments 402 A-N. A variable final message compilation 704 may be generated. The final step, messaging 114, may comprise organizing the variable message compilation 704 to send and view, utilizing one or more delivery enablers and viewing devices. Messages may be sent via text message and/or electronic mail to one or more patients. The message quality may be seamless and may appear to be a single recording to the end recipient (e.g., the patient).

According to one or more embodiments, the method comprising the various steps may comprise multimedia synthesis actions that may be linear in nature but may also be aware of each other. Multimedia synthesis instance 102 (i.e., ecosystem) may comprise the execution of all steps to allow each step to be aware of the other step. According to an illustrative example, once all Steps (a) through (f) are executed, the instance of multimedia synthesis may be complete and may allow a change to any one Step (a) through (f) to understand that specific change, and may adapt the remaining steps within the multimedia synthesis instance 102.

Figure 2:
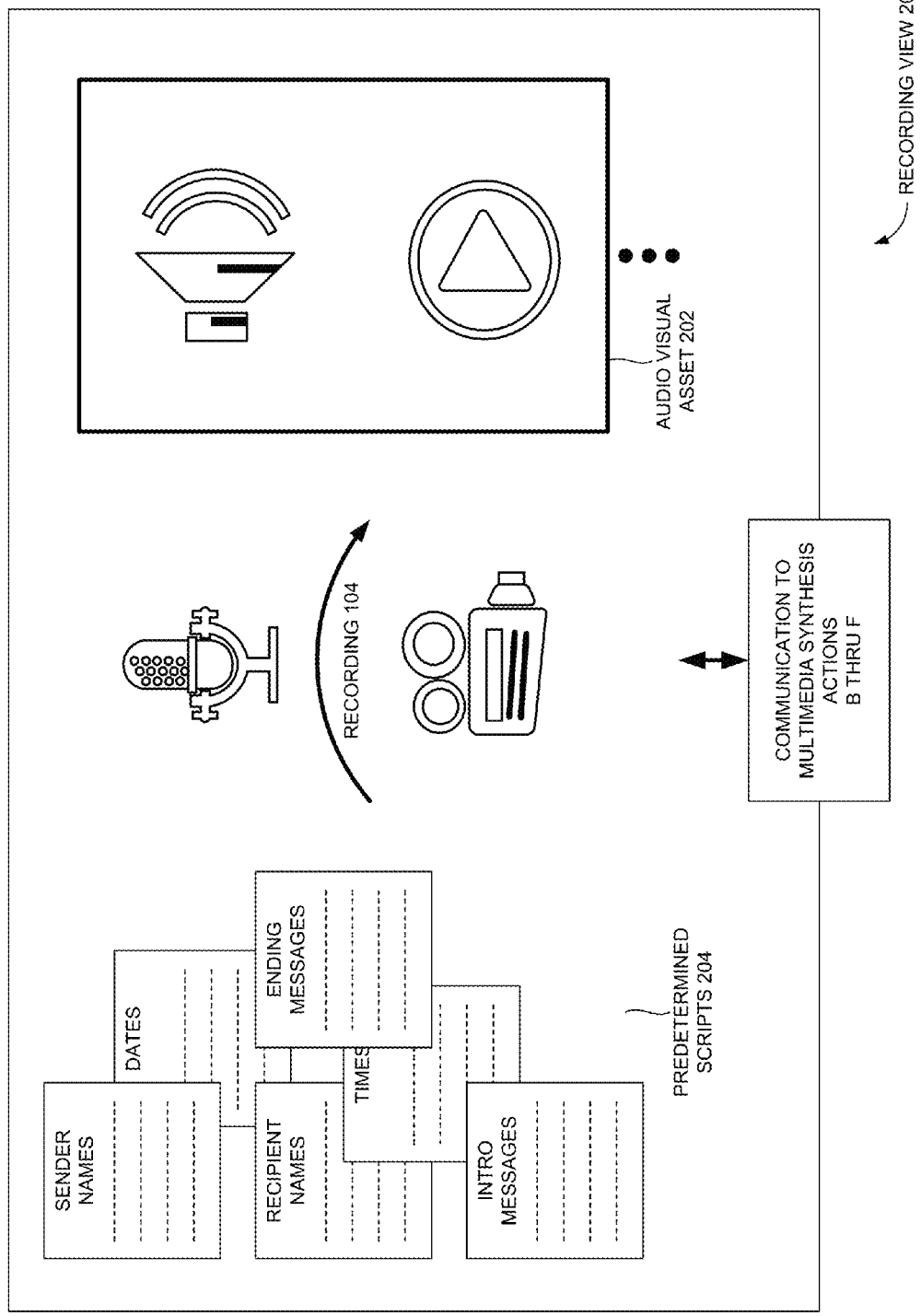
FIG. 2 illustrates a recording view 200, according to one or more exemplary embodiments.

FIG. 2 illustrates a recording view 200, according to one or more embodiments. A predefined script 204 may comprise one or more predefined scripts 204 A-N including but not limited to sender names, dates, recipient names, ending messages, times, and/or intro messages. These may be recorded into one or more audio visual assets 202 A-N, according to one embodiment. This Step (a) may communicate with the multimedia synthesis actions (b) through (f), according to one or more embodiments. The recording 104 of the audio visual asset 202 using the predetermined scripts 204 may be performed using a microphone, an interactive voice response, and/or a doctor, according to one or more embodiments.

According to one or more embodiments, the predetermined script 204 may be organized with line breaks that may prompt when a dialogue during a recording 104 may begin and/or end. The predetermined script 204 line breaks may be defined to be aware of Steps (a) through (f). For example, during (e) compiling 112, there may be a delay in dialogue or non-seamless transitions of dialogue. Thus, (e) compiling 112, may rely on (a) recording 104 a predetermined script 204, to allow proper compiling 112, according to an exemplary embodiment.

According to another embodiment, after Steps (a) through (f) are complete and the multimedia synthesis instance 102 exists, and a change is made to (a) recording 104, then (e) compiling 112, along with Steps (b), (c), (d) and (f) may also be aware and may adapt accordingly. The predefined script 204 may be read over a recording session. The recording session sequence of dialogue may be prompted in a fashion that may be aware of Steps (a) through (f). According to an illustrative example, dialogue prompts may not be recorded based on reading a sentence, but on words that may compile sentences such that a variable final message compilation 704 through the multimedia synthesis instance 102 (Steps (a) through (f)) may be aware.

Figure 4A:
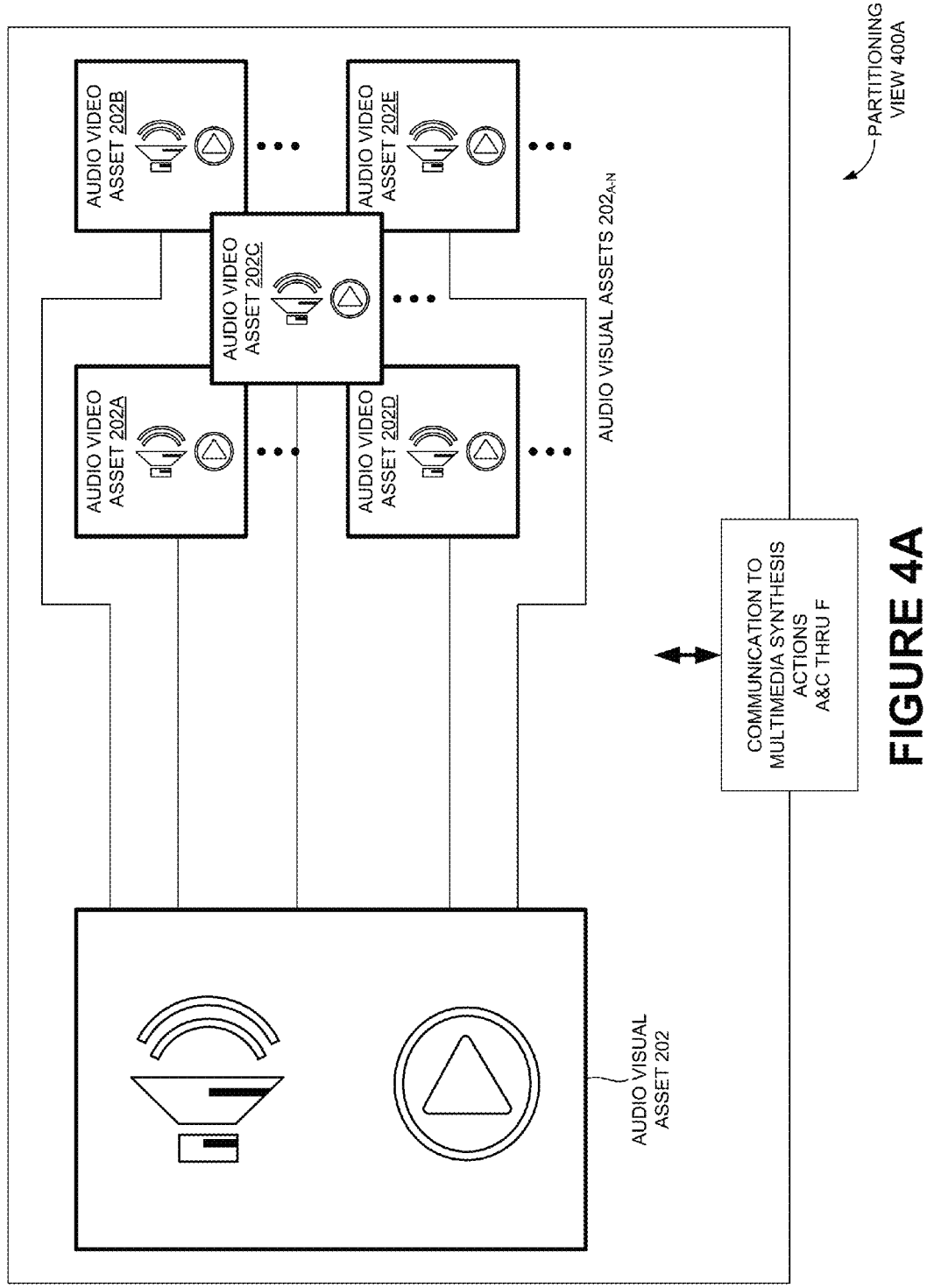
FIGS. 4A and 4B illustrate partitioning views 400A and 400B, according to one or more exemplary embodiments.
Figure 4B:
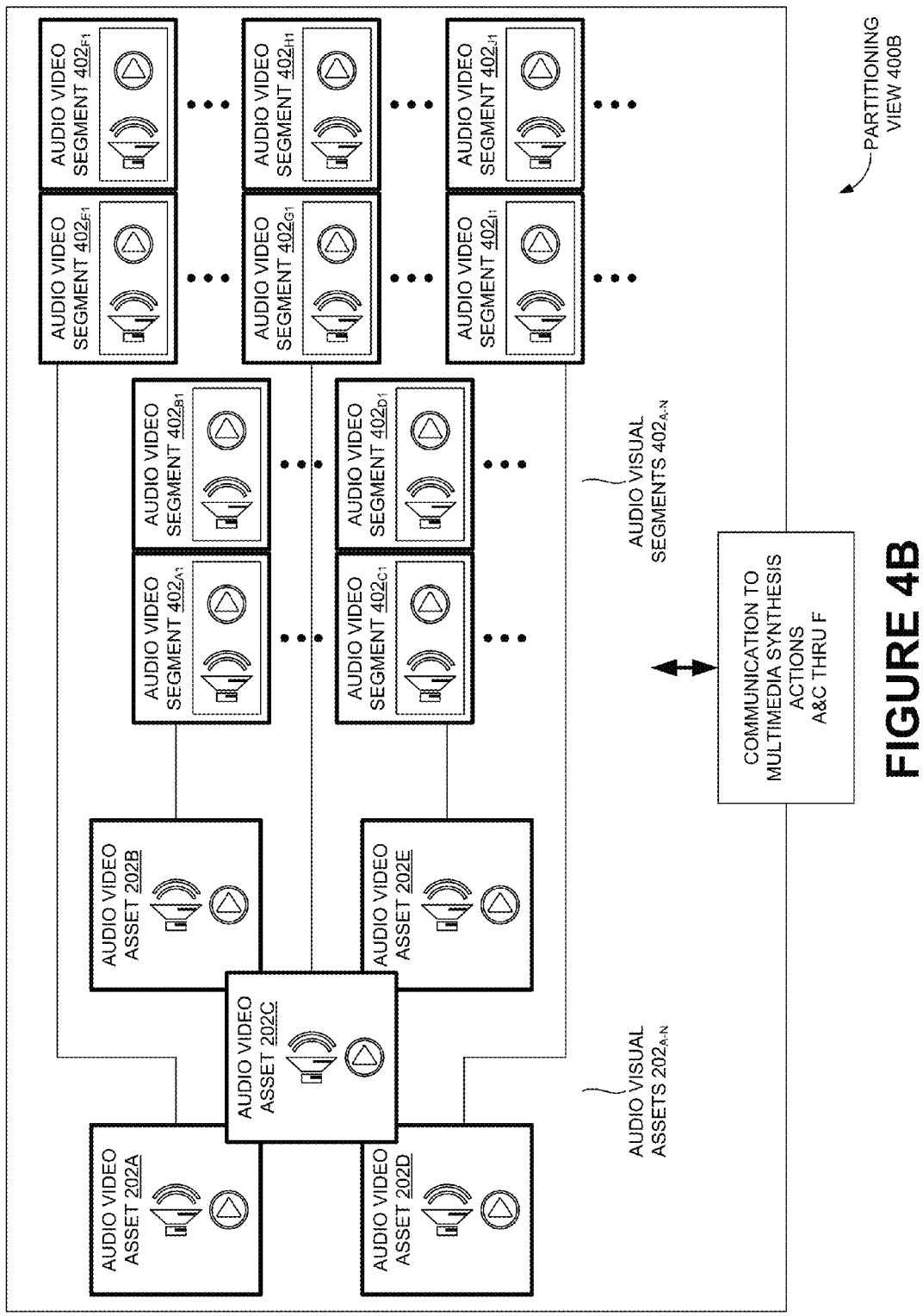

FIG. 3 illustrates a predetermined script view 300, according to one or more embodiments. The predetermined script 204 may comprise several positions comprising a recipient name, a sender name, an introduction message, a date day, a date month, a date number, a date time, a date period, an optional open slot, and/or an ending, each with one or more dialogue options, according to one or more exemplary embodiments. FIGS. 4A and 4B illustrate partitioning views 400A and 400B, according to one or more embodiments. A single audio visual asset 202 may be first partitioned into multiple audio visual assets 202 A-N (see FIG. 4A). The plurality of audio visual assets 202 A-N may then be further partitioned into a plurality of audio visual segments 402 A-N, according to one or more embodiments (see FIG. 4B). Partitioning 106 may communicate with Step (a) and Steps (c) through (f).

A matrix of audio video segments 402 A-N may be organized or filed in a way that each audio visual segment 402 may be aware of other audio visual segments 402 A-N, according to one or more embodiments. Each audio visual segment 402 may be aware of the voice it may be associated with and each audio visual segment 402 may be aware of the message type or context of message is may be associated with, according to one or more illustrative examples. Each audio visual segment 402 may be aware of its association with multiple messages types. For example, a name "Tom" may be recorded and used along multiple message types, and/or a location "New York" may be used along multiple message types, according to one or more exemplary embodiments. Each audio visual segment 402 may be aware of the multi-media synthesis instance 102 and may adopt to change accordingly (see FIGS. 4A and 4B).

Figure 5B:
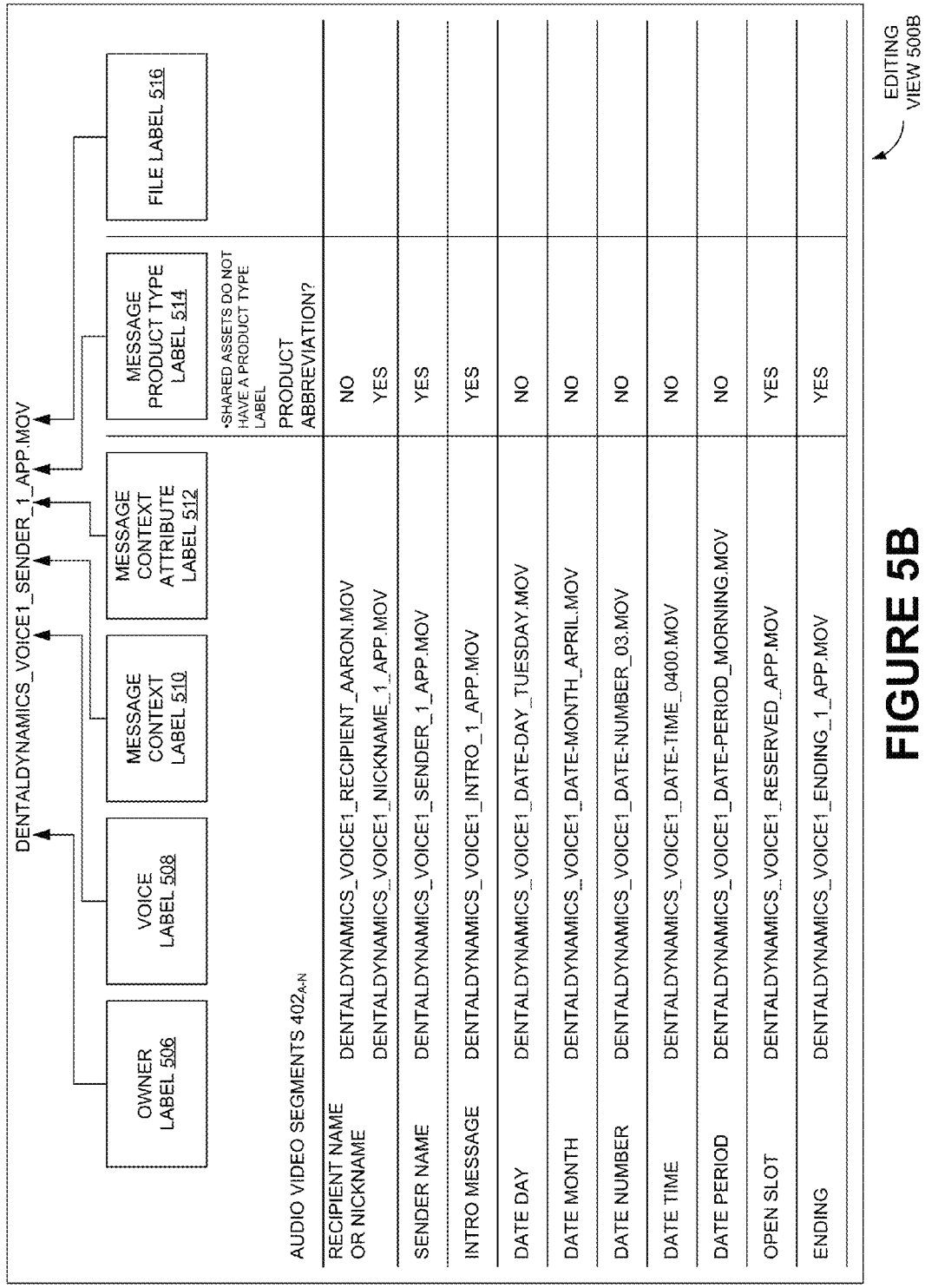

FIGS. 5A and 5B illustrate editing views 500A and 500B, according to one or more embodiments. The plurality of audio visual segments 402A-N may be edited by applying a naming paradigm 502 and/or a data tagging system 504 such that the plurality of audio visual segments 402 A-N may be accessible by an audio visual data tag and exported to the variable final message compilation 704, according to one embodiment. According to another embodiment, the audio visual asset 202 may be sliced and labeled by applying the naming paradigm 502 and/or the data tagging system 504. The naming paradigm 502 that is applied to the plurality of audio visual segments 402 A-N may be organized based on an owner label 506, a voice label 508, a message context label 510, a message context attribute label 512, a message product type label 514 and/or a file type label 516 (see FIG. 5B). The data tagging system 504 that is applied to the plurality of audio visual segments 402 A-N may be applied based on a context with a plurality of variations including but not limited to a group, an output enabler, an output playback, a distribution channel, and/or a pricing, according to one or more embodiments.

Figure 6:
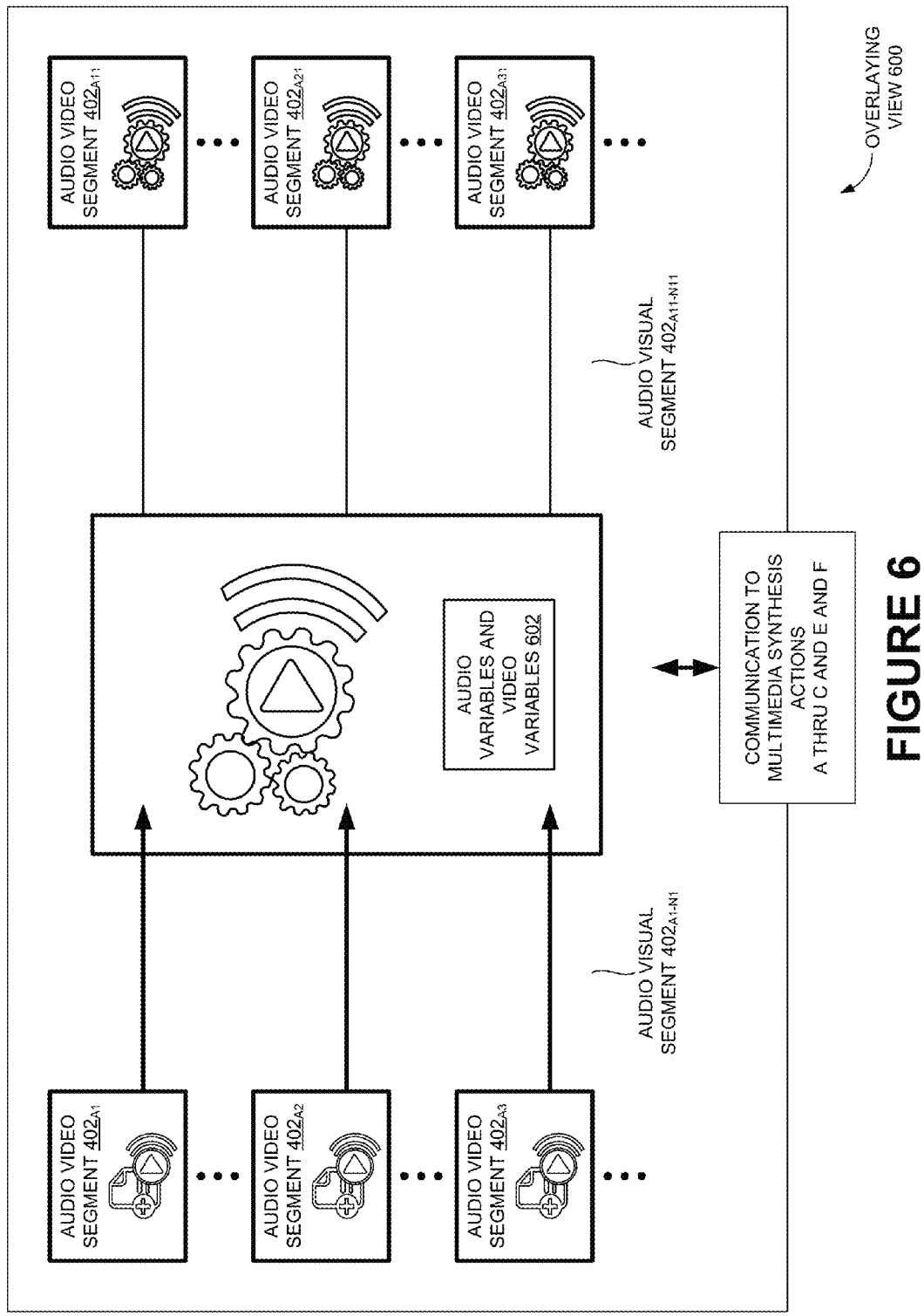
FIG. 6 illustrates an overlaying view 600, according to one or more exemplary embodiments.

FIG. 6 illustrates an overlaying view 600, according to one or more embodiments. The audio visual assets 202A-N may be prepped through a process of creatively overlaying 110 audio visual segments 402 A-N to anticipate the variable final message compilation 704. The overlaying 110 of the plurality of audio visual segments 402 A-N with the plurality of audio visual variables may be applied based on a message type, an audio type, a video type, and/or a personalization, according to one or more embodiments. Overlaying 110 may have awareness that Steps (a) through (f) of the multimedia synthesis instance 102 may be complete and according to one embodiment, overlaying 110 may also allow allowing more variation in overlaying 110, once Steps (a) through (f) of the multimedia synthesis instance 102 are complete.

Figure 7:
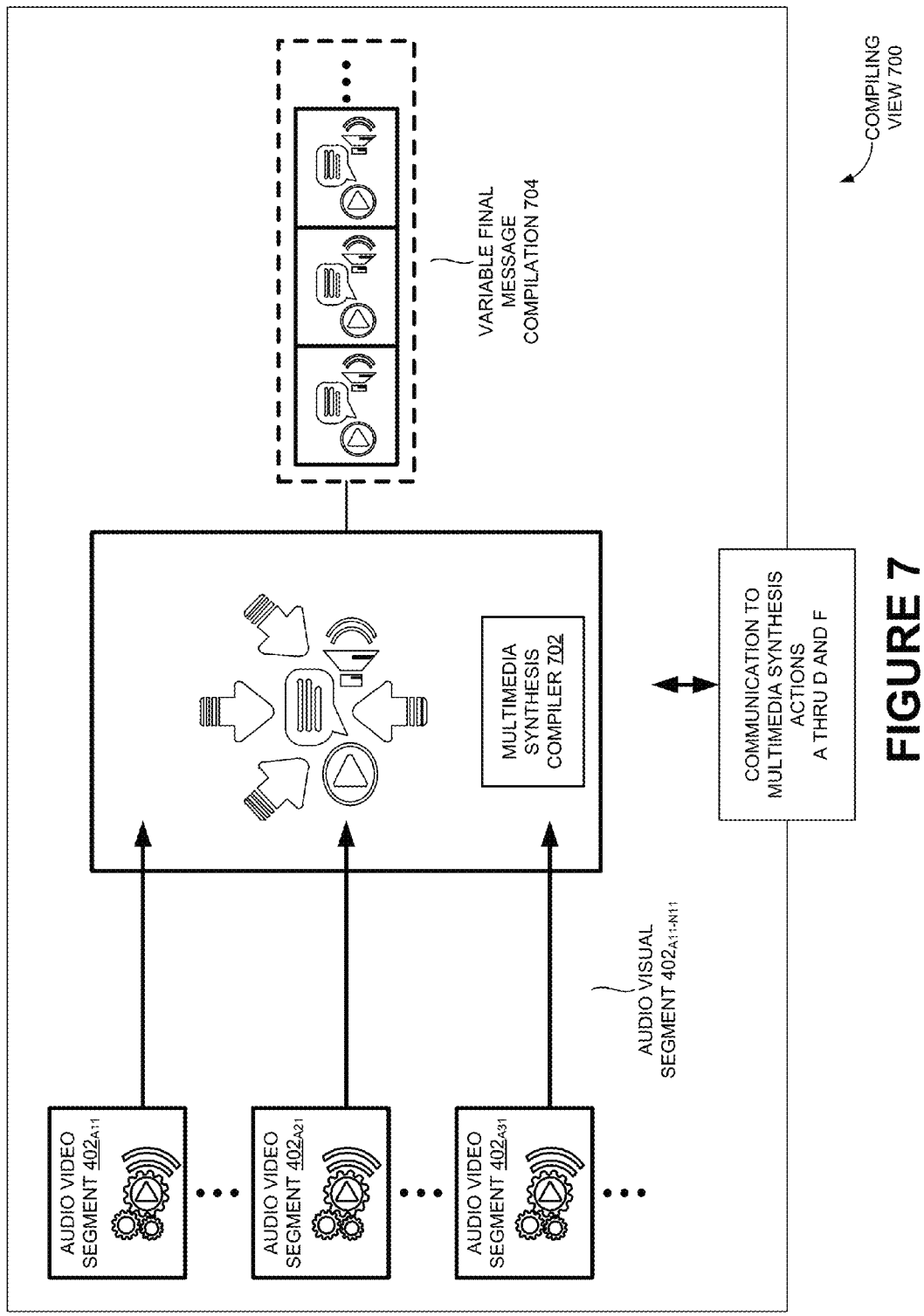
FIG. 7 illustrates a compiling view 700, according to one or more exemplary embodiments.

FIG. 7 illustrates a compiling view 700, according to one or more embodiments. Compiling 112 may comprise compiling 112 the plurality of audio visual segments 402A-N by uploading the plurality of audio visual segments 402 A-N into a multimedia synthesis compiler 702 such that the variable final message compilation 704 may be generated, according to one embodiment. According to another embodiment, the multimedia synthesis compiler 702 may comprise matching within the multimedia synthesis compiler 702. It may also have awareness of Steps (a) through (f) of the multimedia synthesis instance 102 and the variables associated with each Step (a) through (f) to complete its action in a quick and automated manner, according to an illustrative example. The variable final message compilation 704 generated in the compiling 112 step may now allow an end user through messaging 114 to adjust variables within this final message, according to one or more exemplary embodiments.

Figure 8:
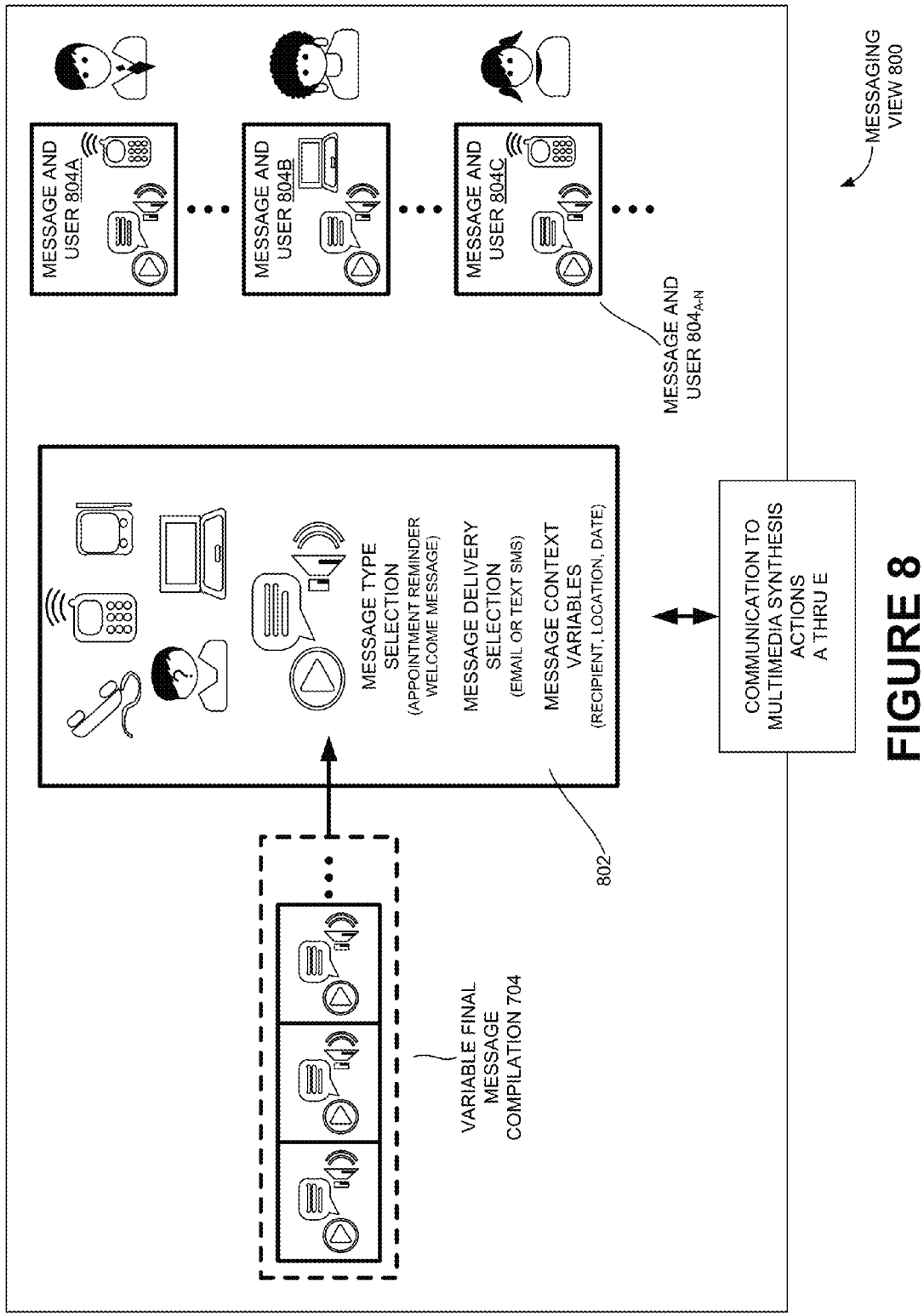
FIG. 8 illustrates a messaging view 800, according to one or more exemplary embodiments.

FIG. 8 illustrates a messaging view 800, according to one or more embodiments. The final step in the method may comprise messaging 114 a user by selecting a message type from the variable final message compilation 704 generated from the plurality of audio visual segments 402 A-N, according to one or more exemplary embodiments. Messaging 114 may have a consistent awareness of Steps (a) through (f) of the multimedia synthesis instance 102 as an end user may use the messaging tool as a mechanism to touch Steps (a) through (f).

Figure 9:
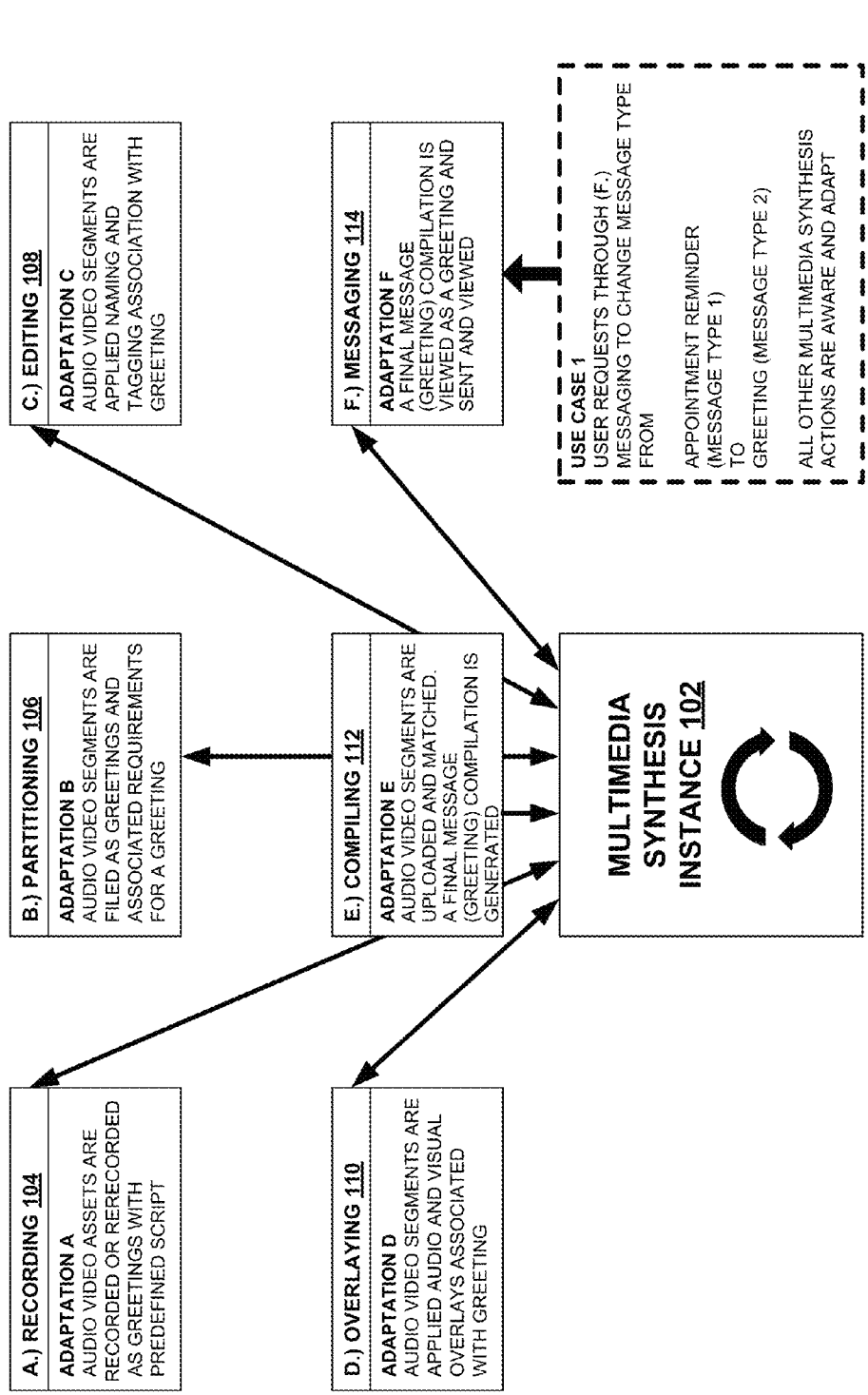
FIG. 9 illustrates a use case 1 view 900, according to one or more exemplary embodiments.
Figure 10:
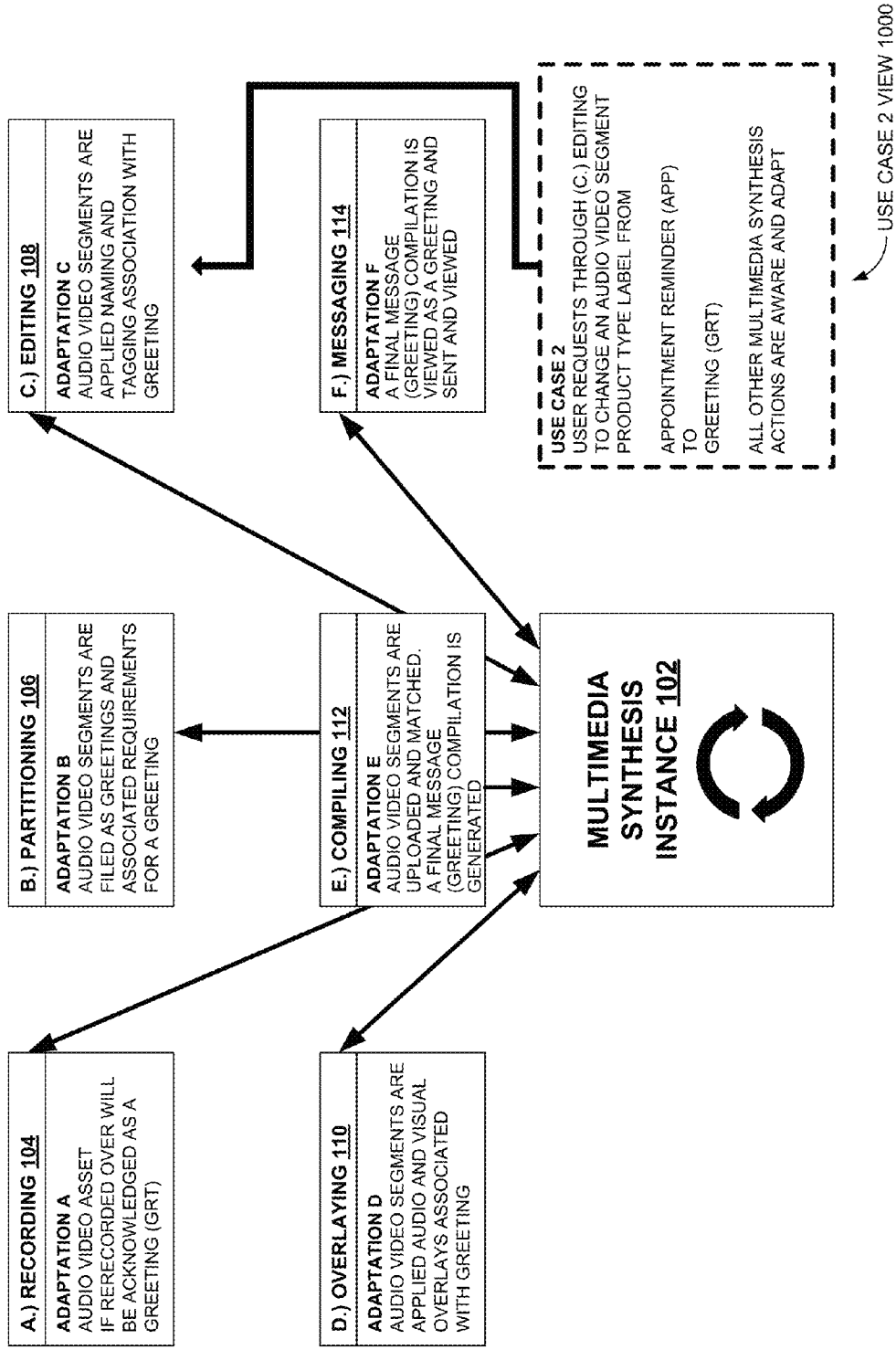
FIG. 10 illustrates a use case 2 view 1000, according to one or more exemplary embodiments.

FIG. 9 and FIG. 10 illustrate two exemplary use cases, according to one or more embodiments. Recording 104 may comprise an Adaptation A wherein audio visual assets 202 may be recorded and/or re-recorded as greetings with a predetermined script 204, according to one embodiment. According to another embodiment, partitioning 106 may comprise Adaptation B wherein audio visual segments 402 may be filed as greetings and associated with other requirements for a greeting. In one exemplary embodiment, editing 108 may comprise an Adaptation C wherein the audio visual segments 402 may be applied using a naming methodology 502 and/or a data tagging system 504 with greetings. Overlaying 110, according to one embodiment, may comprise Adaptation D wherein audio visual overlays may be applied to the audio visual segments 402 associated with the greetings. According to one exemplary embodiment, compiling 112 may comprise Adaptation E wherein audio visual segments 402 may be uploaded and matched. A variable final message compilation 704 (e.g., a greeting) then may be generated.

Figure 11:
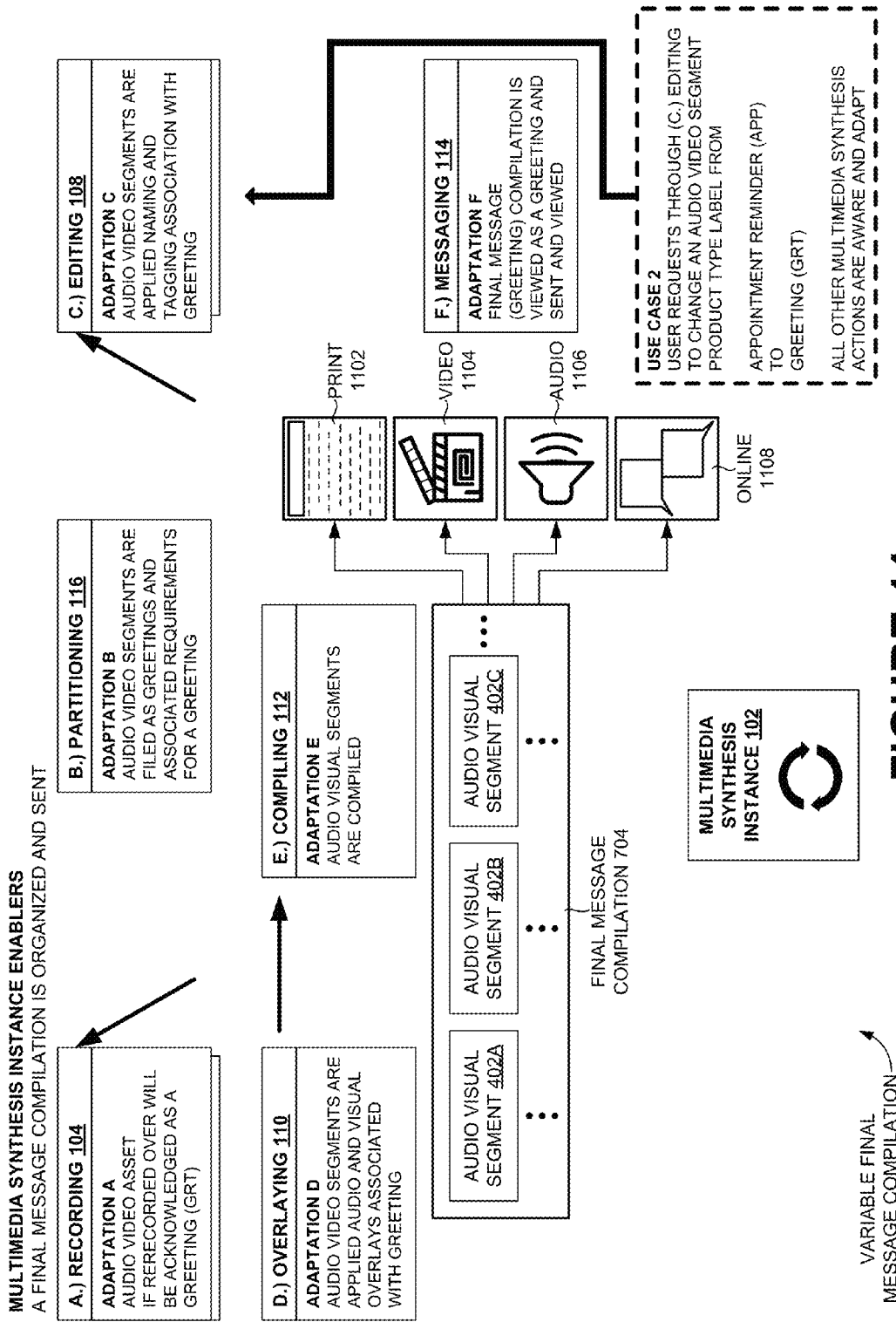
FIG. 11 illustrates a variable final message compilation view 1100, according to one or more exemplary embodiments.

Finally, and according to FIG. 11 and one or more illustrative embodiments, messaging 114 may comprise Adaptation F wherein a variable final message compilation 704 (e.g., a greeting) may be viewed as a greeting and sent to one or more parties (e.g., one or more patients). The multi-media synthesis compiler 702 may compile the variable final message compilation 704 such that the variable final message compilation 704 may be outputted in a plurality of audio visual formats including but not limited to print 1102, video 1104, audio 1106 and/or online 1108, according to one or more embodiments.

Figure 12:
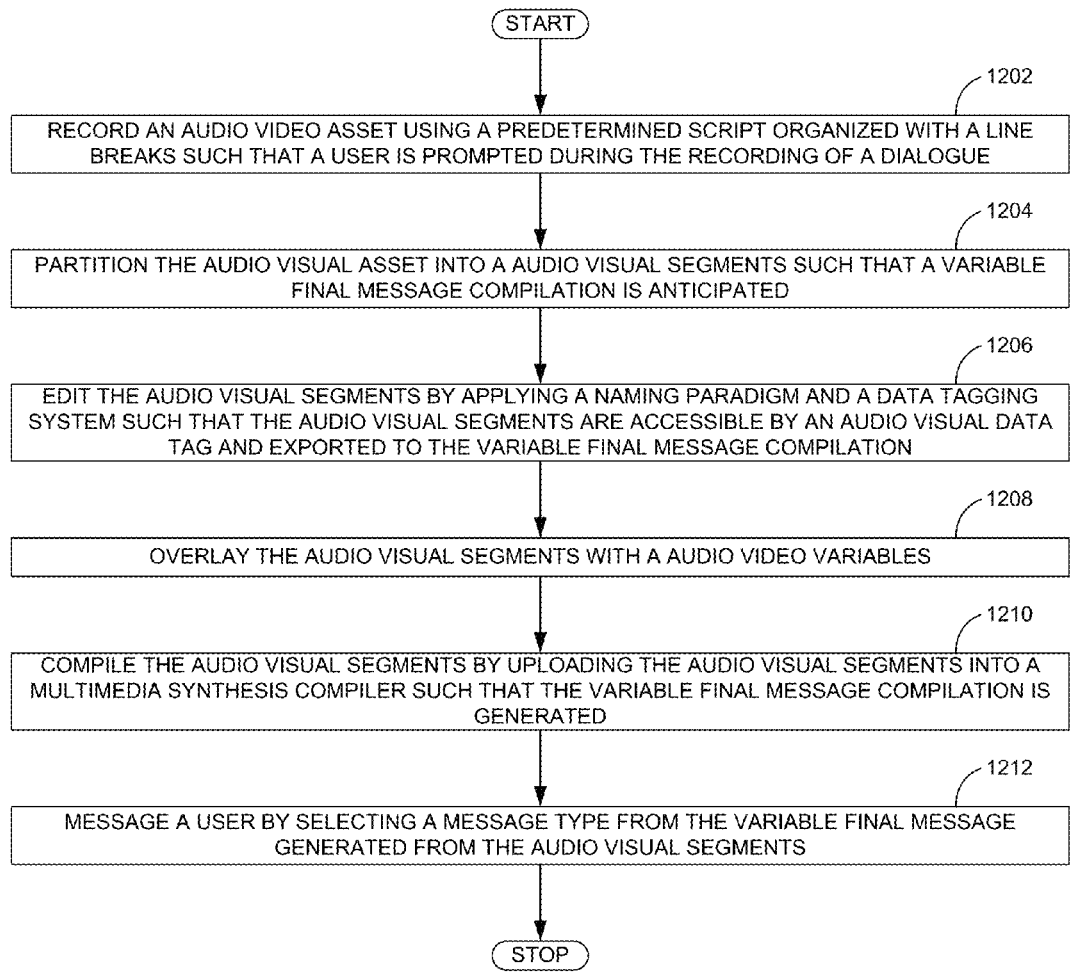
FIG. 12 is a flowchart of the six steps (a) through (f), according to one or more exemplary embodiments.
Figure 13A:
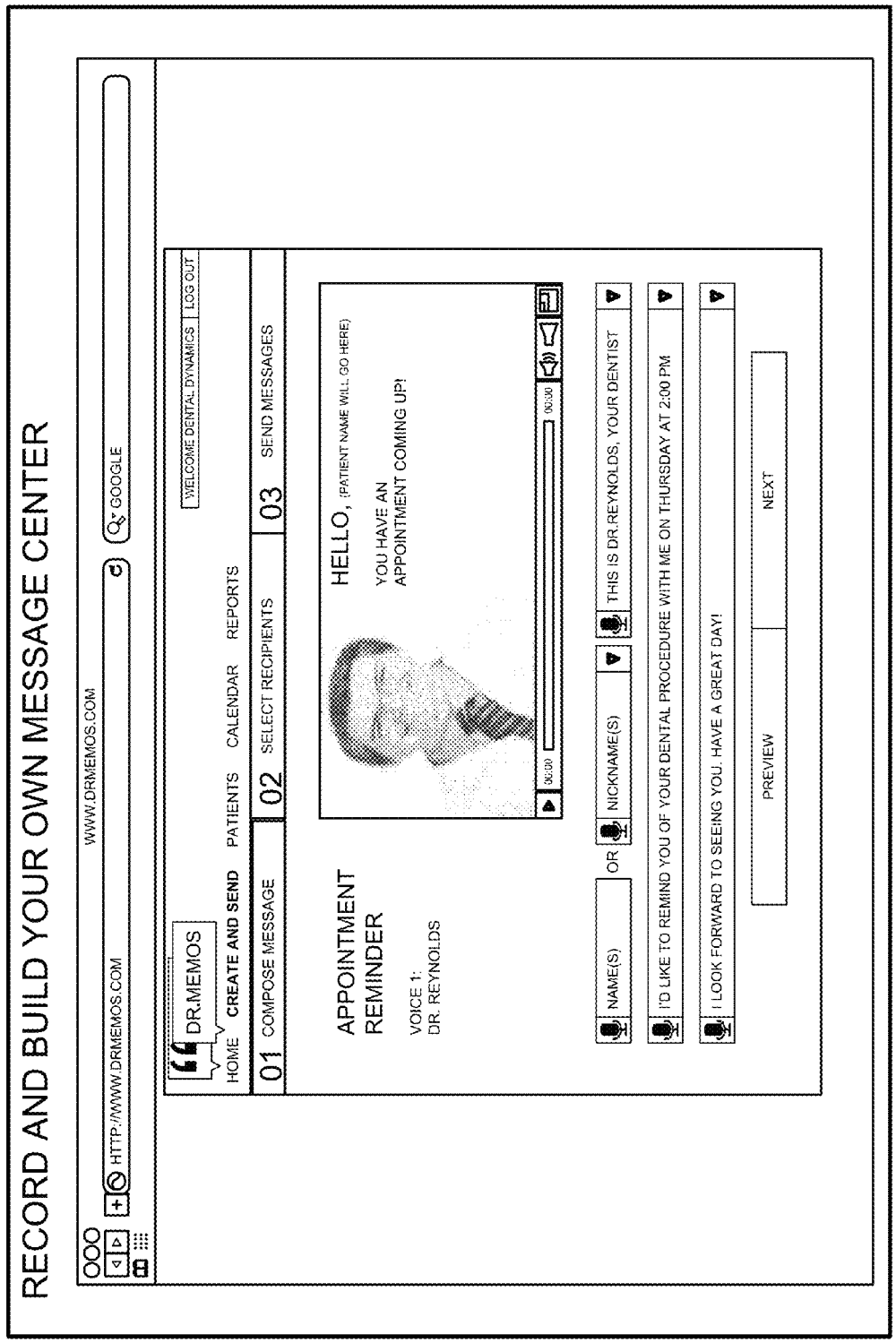
Figure 13B:
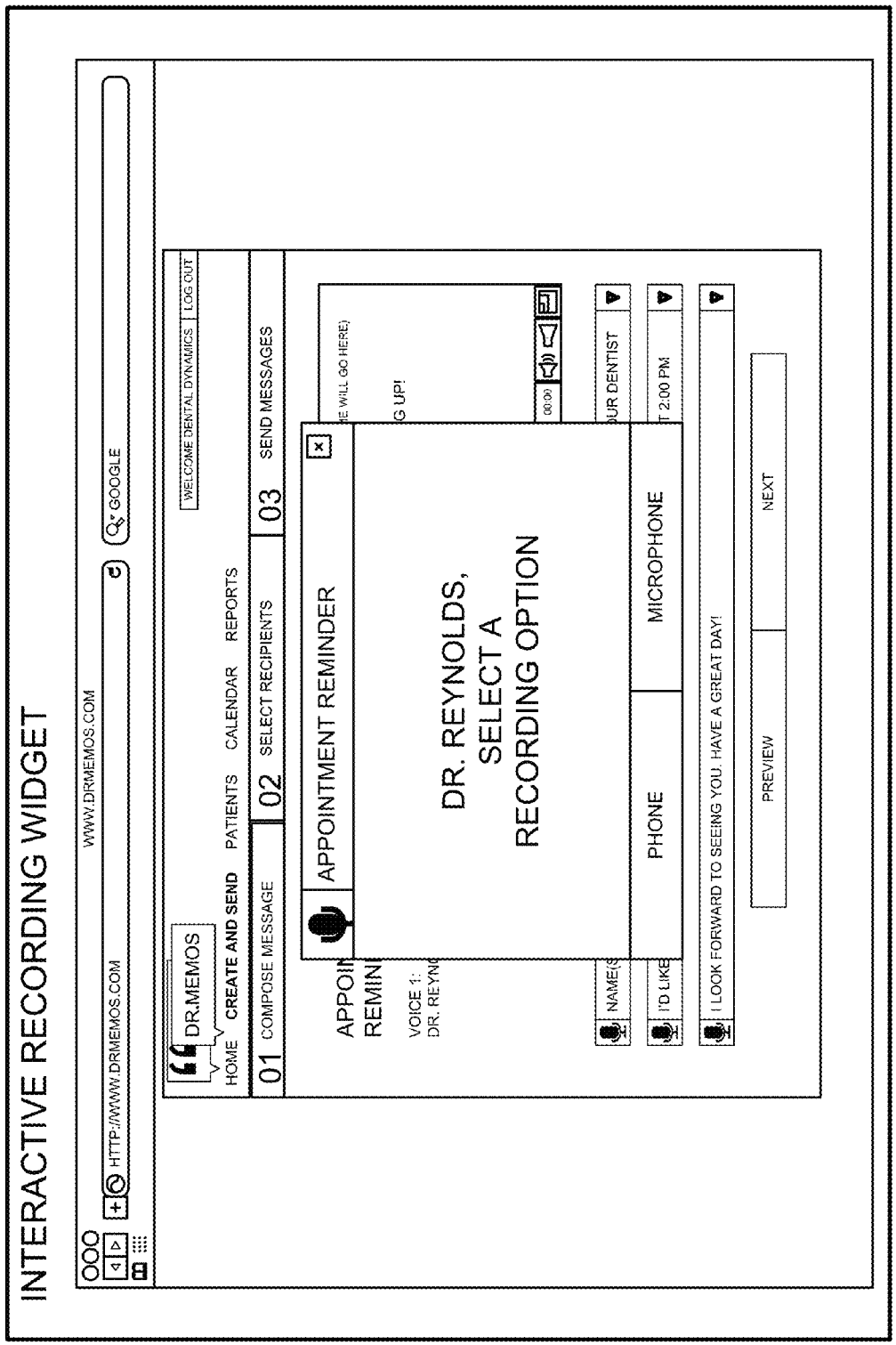
Figure 13C:
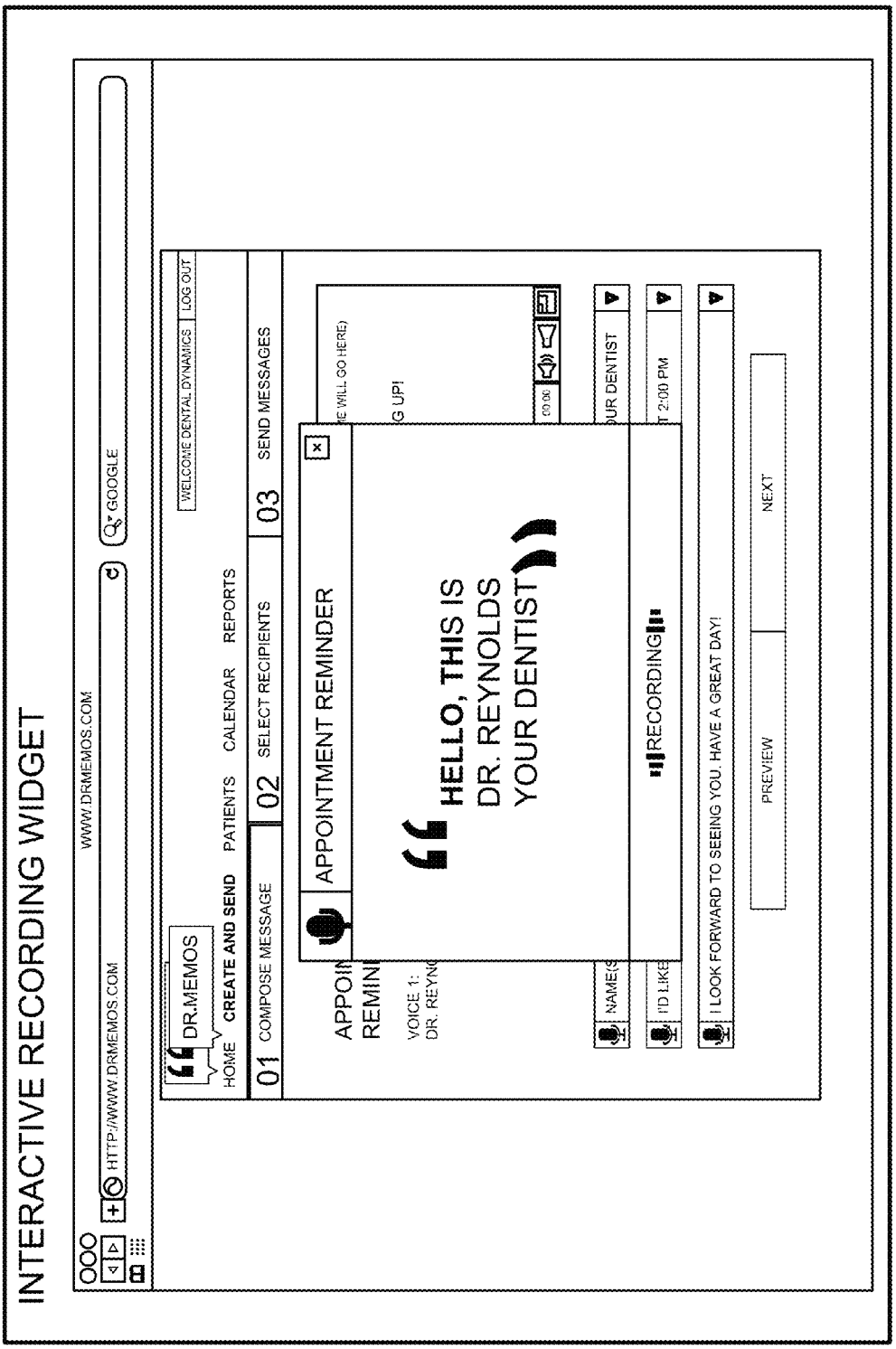
Figure 13D:
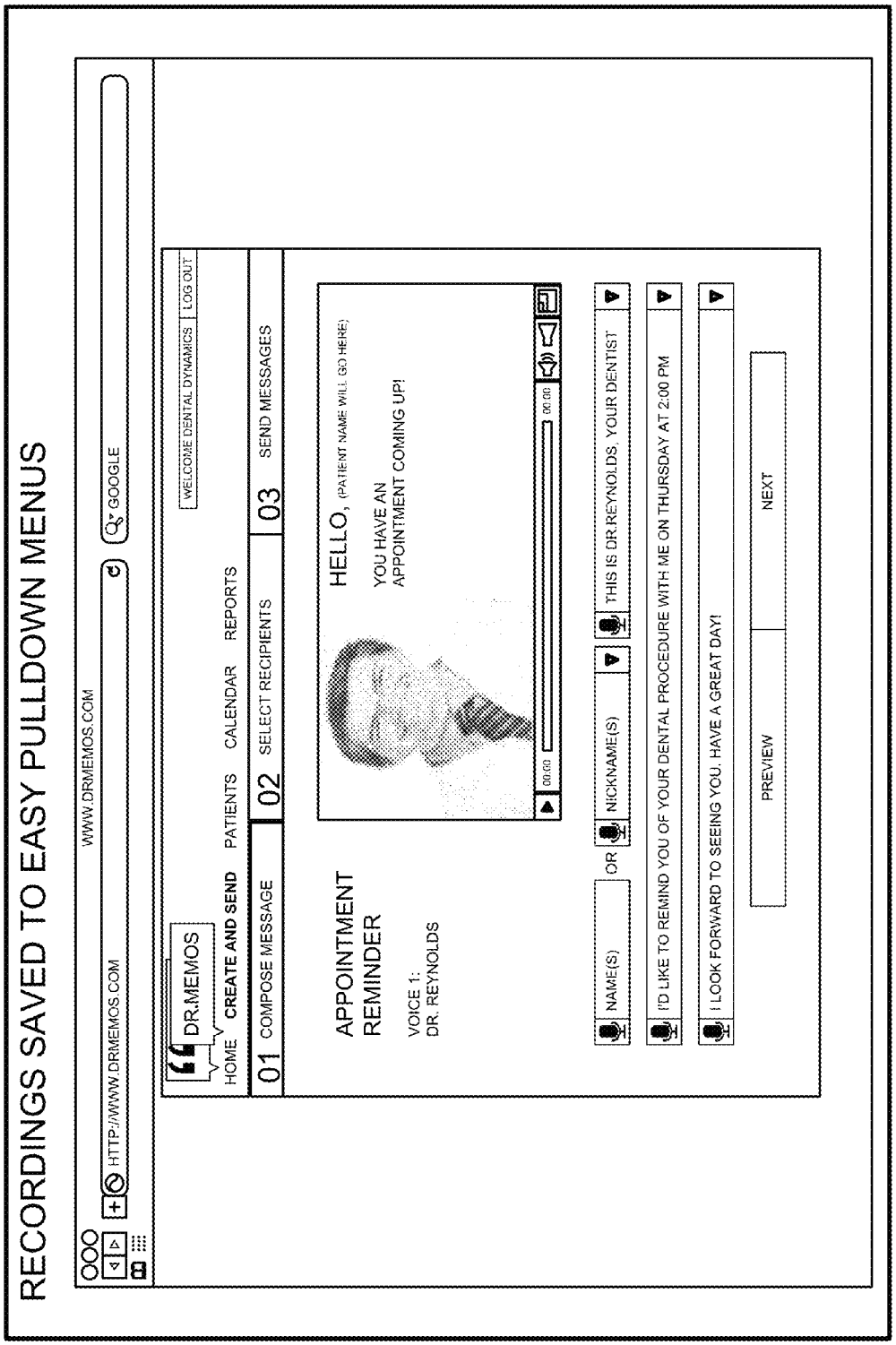
Figure 13E:
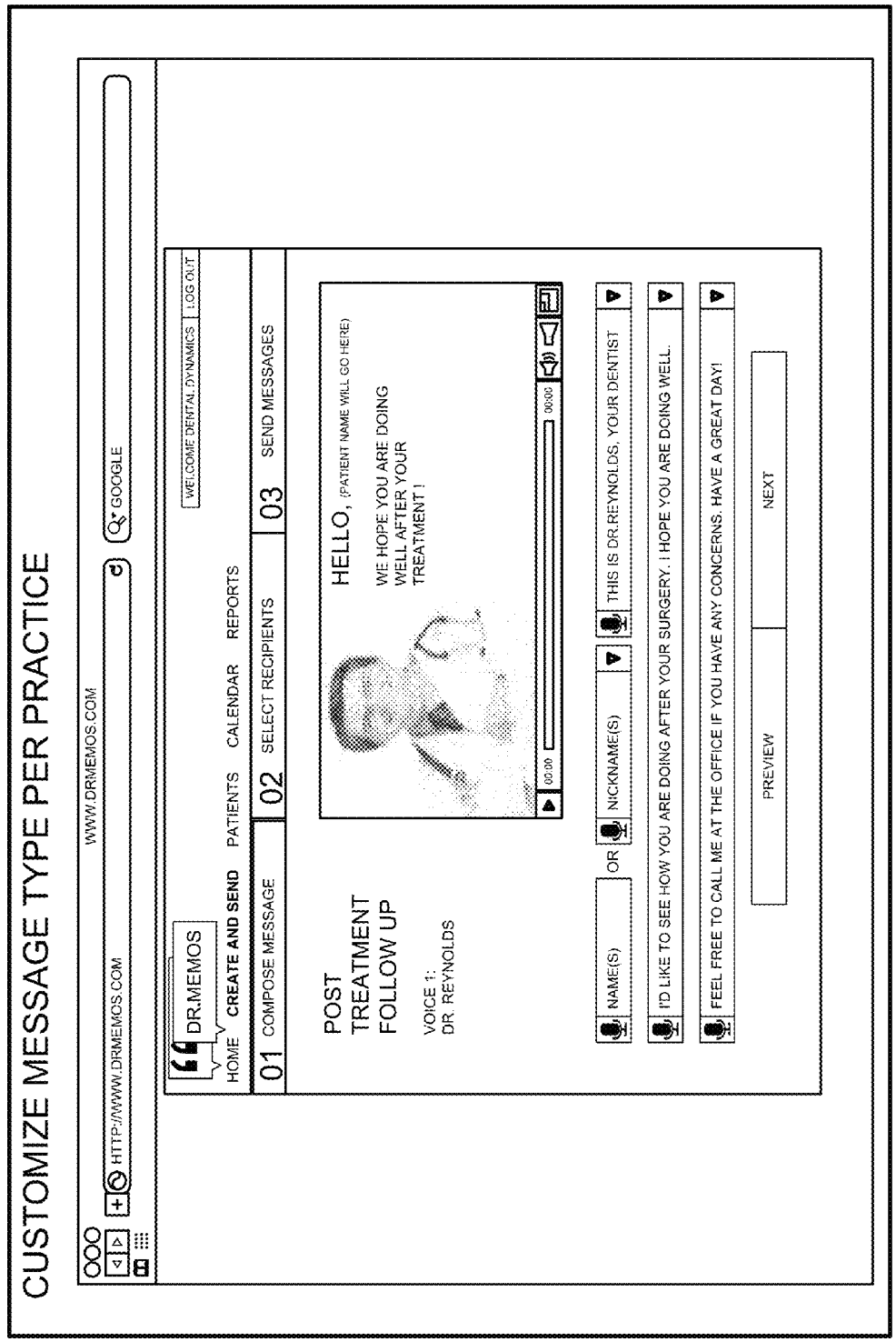
Figure 13G:
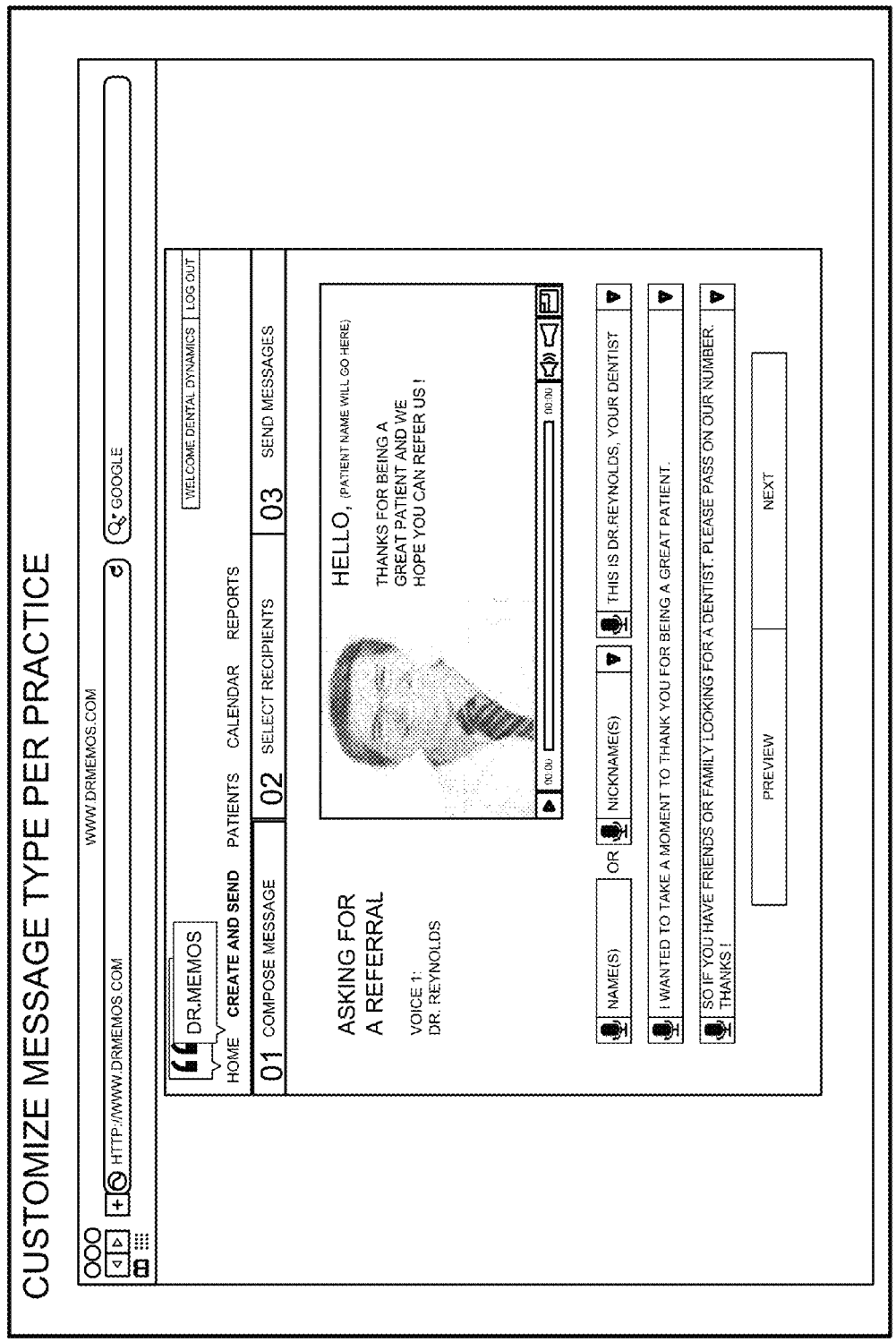
Figure 13H:
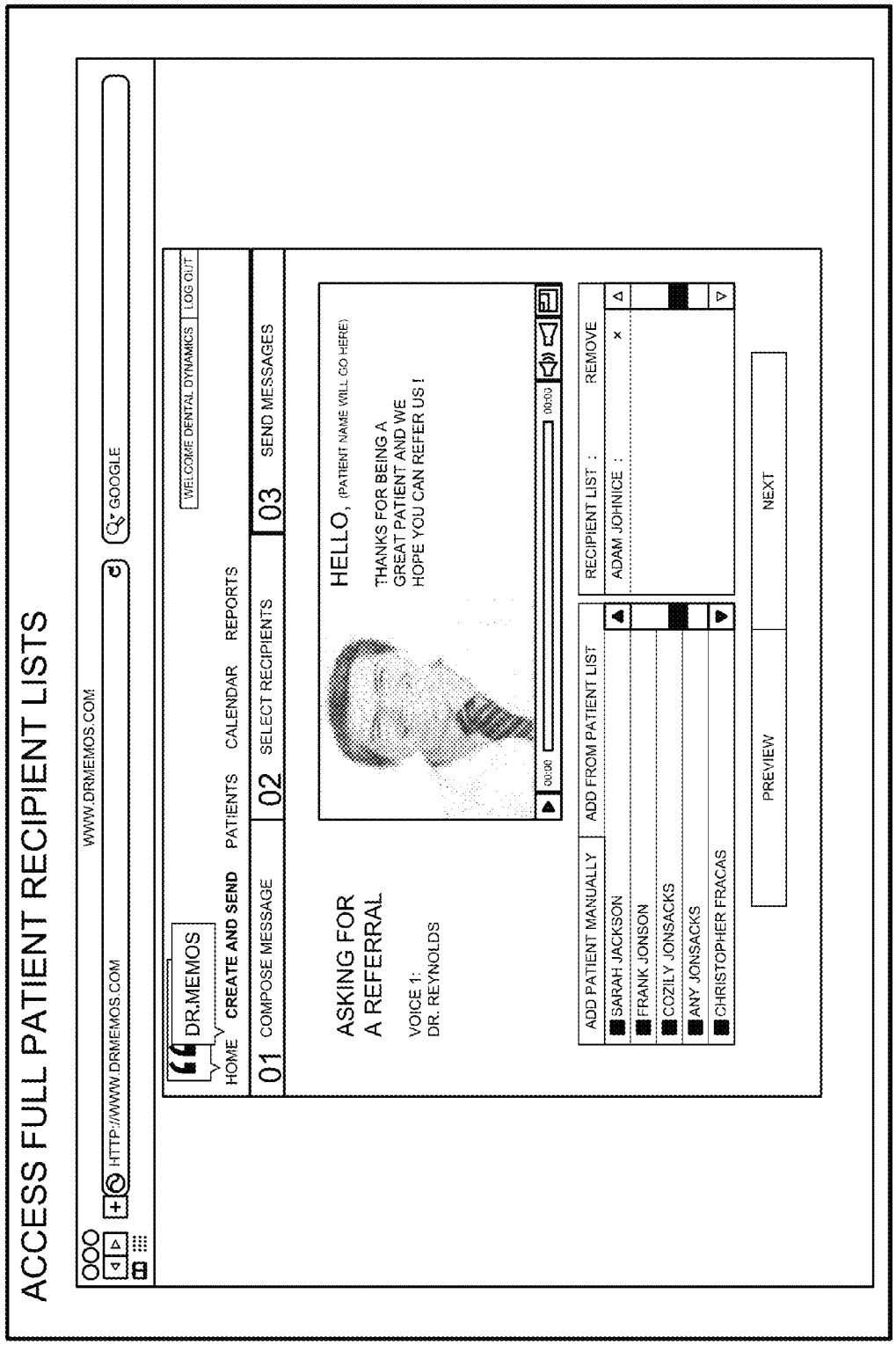
Figure 13I:
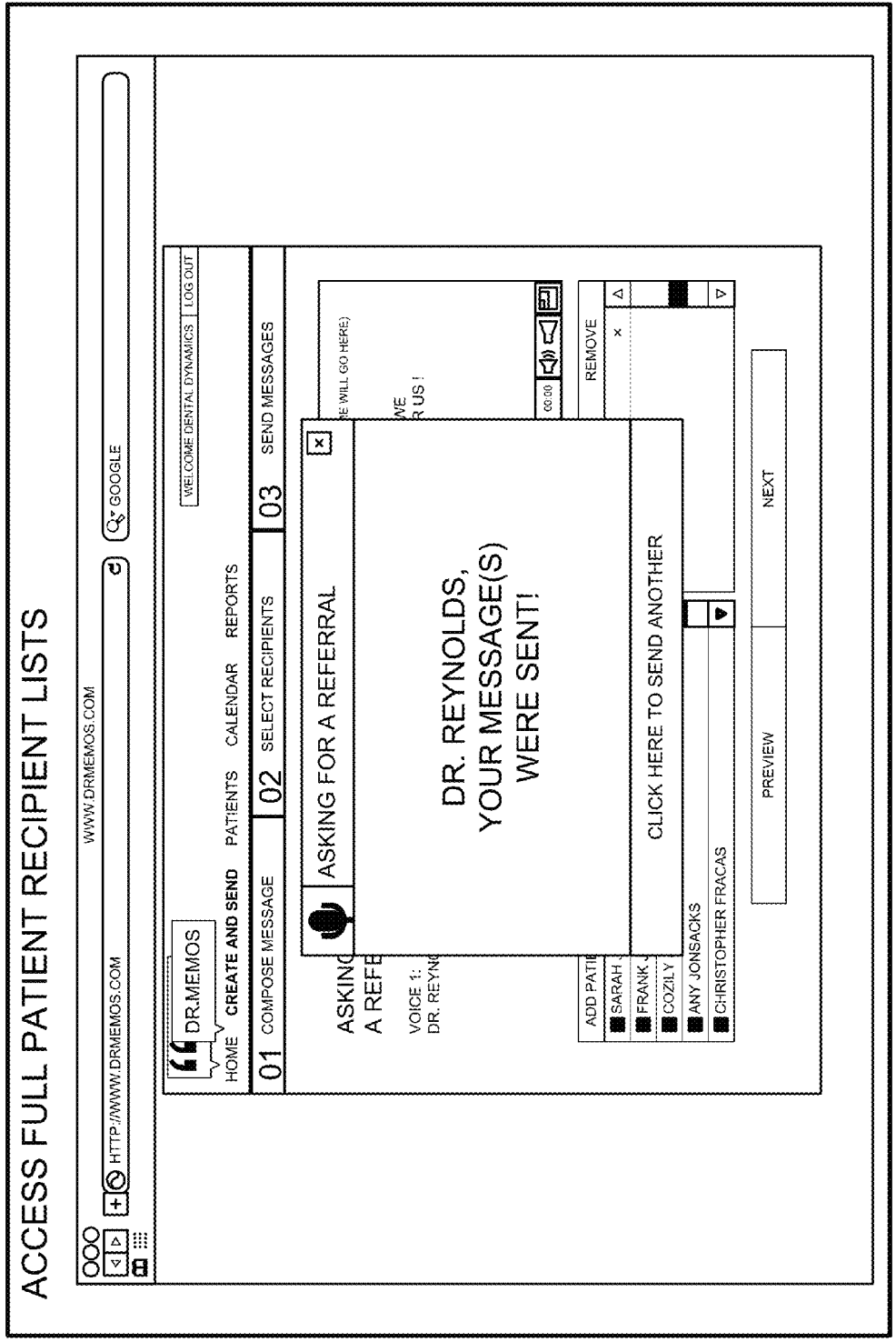
Figure 13J:
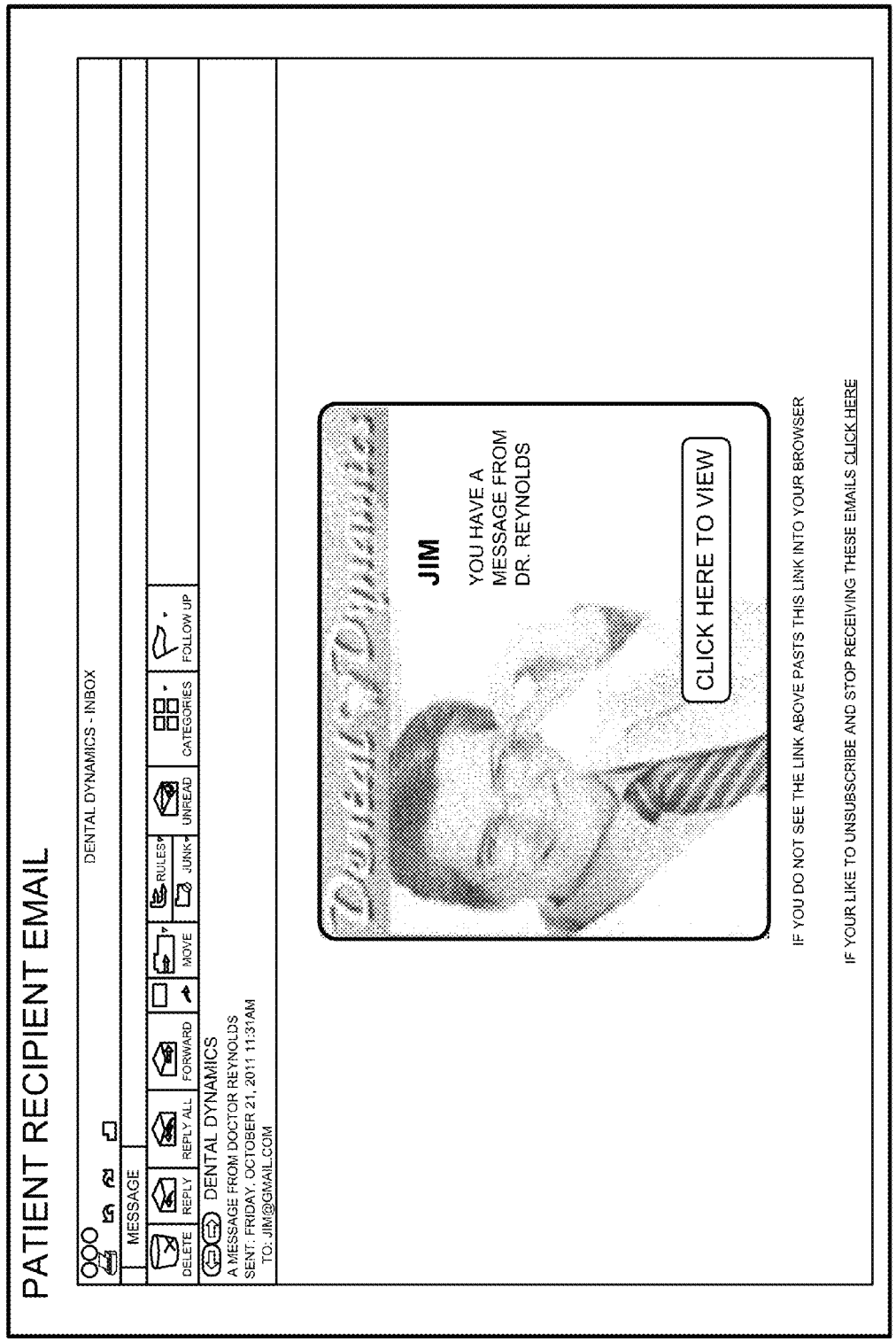
Figure 13K:

FIG. 12 is a flowchart of the six steps (a) through (f), according to one or more exemplary embodiments. According to one embodiment, Step (a) may comprise recording 104 an audio visual asset 202 using a predetermined script 204 organized with a plurality of line breaks such that a user may be prompted during the recording 104 of a dialogue. The recording 104 may be performed with a recording session wherein the predetermined script 204 may turn into multiple audio visual assets 202A-N and multiple names (e.g., patient names). The recording 104 may be performed via phone (i.e., Interactive Voice Response), by microphone and/or by a doctor, according to one or more embodiments.

Step (b), according to one or more embodiments, may comprise partitioning 106 the audio visual asset into a plurality of audio visual segments 402A-N such that a variable final message compilation 704 may be anticipated. According to other embodiments, Step (c) may comprise editing 108 the plurality of audio visual segments 402 A-N by applying a naming paradigm 502 and/or a data tagging system 504 such that the plurality of audio visual segments 402 A-N may be accessible by an audio visual data tag and exported to the variable final message compilation 704. The audio visual asset 202 may be sliced and labeled by applying the naming paradigm 502 and/or the data tagging system 504. Multiple audio visual assets 202 A-N may be subjected to this step, according to one embodiment. Editing 108 may be done by the application and no human interaction may be required.

Step (d), according to one or more embodiments, may comprise overlaying 110 the plurality of audio visual segments 402 A-N with a plurality of audio visual variables. The audio visual assets 202 A-N may be prepped through a process of creatively overlaying 110 audio visual segments 402 A-N to anticipate the variable final message compilation 704.

It will be appreciated that, according to one or more illustrative embodiments, Step (e) may comprise compiling 112 the plurality of audio visual segments 402 A-N by uploading the plurality of audio visual segments 402A-N into a multimedia synthesis compiler 702 such that the variable final message compilation 704 may be generated. Step (f), the final step in the method, may comprise messaging 114 a user by selecting a message type from the variable final message compilation 704 generated from the plurality of audio visual segments 402 A-N, according to one or more exemplary embodiments.

FIGS. 13A through 13K illustrate various user interface views of the doctor and patient communication method, according to one or more exemplary embodiments. eMemos may be, according to one or more embodiments, a marketing service and subscription based web application for businesses to send their customers electronic mails, text messages or call messages in their own voice. eMemos may target a wide range of business sectors including but not limited to attorneys, accountants, investment professionals, insurance agents, and financial advisors in the professional sector. It may also target salons, med spas, massage therapists, personal trainers, and travel agents in the personal services sector. eMemos may also target businesses in the retail sector such as automobile dealerships etc.

FIGS. 13A through 13K illustrate exemplary user interface views for Dr. Memos—a customizable variation of eMemos, according to one or more embodiments. DPMSC may be used to build other innovative products including Dr. Memos, according to one embodiment. Dr. Memos may use medical information exchanged from one site to another via electronic communications to improve a patient's health status, according to one or more embodiments. Videoconferencing, transmission of still images, e-health patient portals, remote monitoring of vital signs, continuing medical education and nursing call centers may all be performed by eMemos, according to one or more embodiments.

The DPMSC as embodied in eMemos (see FIGS. 13A through 13K) may also be applicable to political communications, according to one or more embodiments. Action Vote may send thousands of emails, text messages or a phone call in a politician's voice to voters, according to an illustrative example. It will be appreciated that, political candidates on national and state levels may benefit from an adaptation of DPMSC (e.g., Action Vote). Action Vote may connect political candidates directly to voters by performing the following functions including but not limited to addressing the voter by name, age group and location, discussing regional issues or concerns, concerns of voters by age group, concerns of voters by lifestyle and religious background, and addressing groups of voters by issue or concern (e.g., economy, environment, immigration, etc.) according to one or more illustrative embodiments.

It will be appreciated that Dr. Memos may be a subscription based service based on a web/internet application that may send multimedia emails, text messages, and/or call messages to patients in the voice of a doctor and/or any other medical professional, third party and/or person. The target market for Dr. Memos, according to one or more embodiments, may include dentists, cosmetic/plastic surgeons, optometrists, family physicians, internists, surgeons, chiropractors, dermatologists, and/or health professionals in private practice. The value to health professionals, according to one or more exemplary embodiments, may include thank you for referrals/asking for referrals, broken/cancelled appointment follow up, personalized greetings (e.g., birthdays and holidays), post treatment follow up, and/or patient re-activation.

Figure 14:
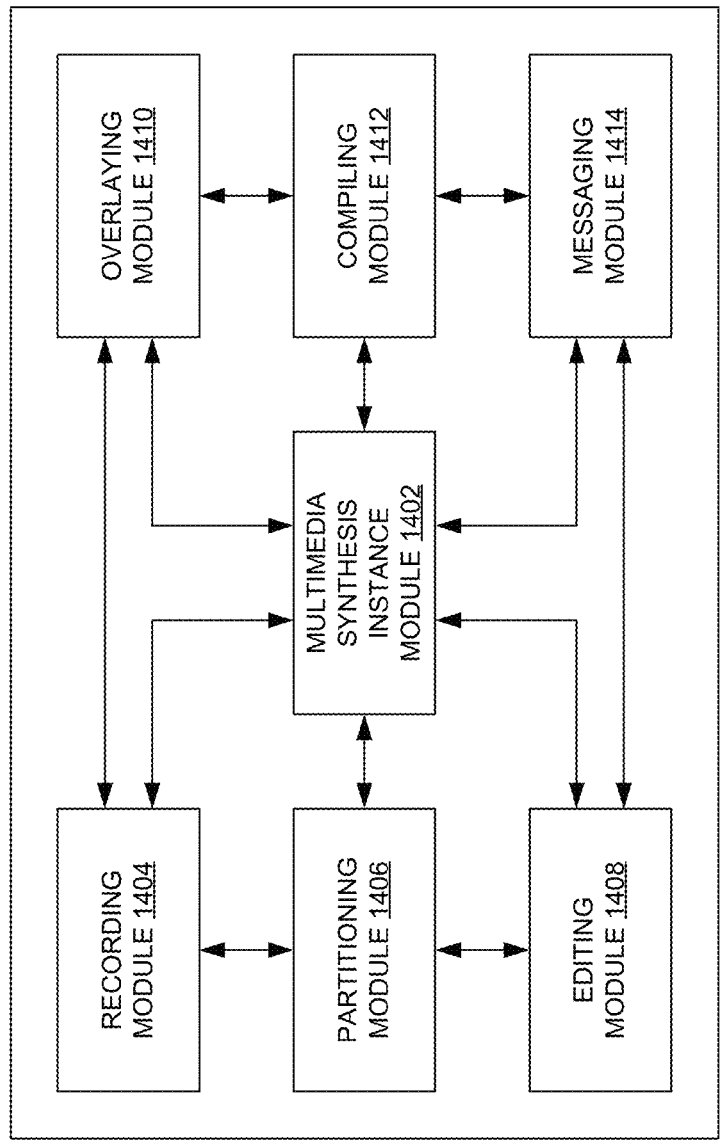
FIG. 14 illustrates a module view of a software module wherein any of the embodiments described herein may be performed and/or executed, according to one or more exemplary embodiments.

FIG. 14 illustrates a module view of a software module wherein any of the embodiments described herein may be performed and/or executed, according to one or more exemplary embodiments. Any of the embodiments described herein may be performed in the following modules, including but not limited to a recording module 1404, a partitioning module 1406, an editing module 1408, an overlaying module 1410, a compiling module 1412, a messaging module 1414, and/or a multimedia synthesis instance module 1402, according to one or more exemplary embodiments.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/ or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

Particularly, several modules may be employed to execute the present embodiments. The search module, the price module, the authentication module, the discount module, the download module, the tracking module, and all other modules may be enabled using software and/or using transistors, logic gates, and electrical circuits (e.g., application specific integrated ASIC circuitry) such as a security circuit, a recognition circuit, a dynamic landmark circuit, an ignition event circuit, a store circuit, a transform circuit, an ICE circuit, and other circuits.

Figure 15:
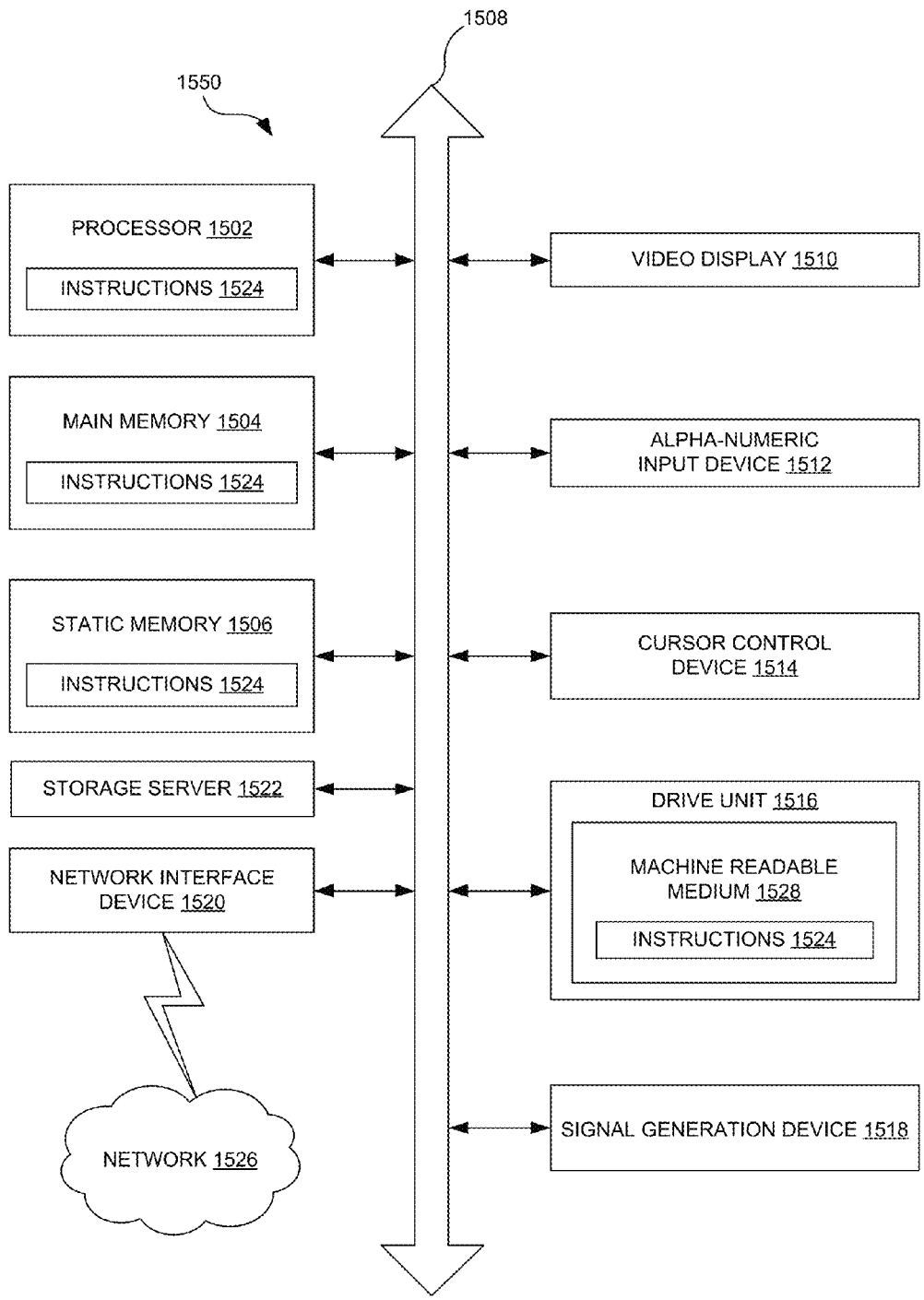
FIG. 15 is an illustration of a computer system with a non-transitory memory wherein any of the embodiments described herein may be performed and/or executed, according to one or more exemplary embodiments.

FIG. 15 may indicate a personal computer and/or the data processing system in which one or more operations disclosed herein may be performed. The processor 1502 may be a microprocessor, a state machine, an application specific integrated circuit, a field programmable gate array, etc. (e.g., Intel® Pentium® processor, 620 MHz ARMI176®, etc.). The main memory 1504 may be a dynamic random access memory, a non-transitory memory, and/or a primary memory of a computer system. The static memory 1506 may be a hard drive, a flash drive, and/or other memory information associated with the data processing system. The bus 1508 may be an interconnection between various circuits and/or structures of the data processing system. The visual display 1510 may provide graphical representation of information on the data processing system. The alpha-numeric input device 1512 may be a keypad, a keyboard, a virtual keypad of a touchscreen, and/or any other input device of text (e.g., a special device to aid the physically handicapped). The cursor control device 1514 may be a pointing device such as a mouse. The drive unit 1516 may be the hard drive, a storage system, and/or other longer term storage subsystem. The signal generation device 1518 may be a bios and/or a functional operating system of the data processing system. The network interface device 1520 may be a device that performs interface functions such as code conversion, protocol conversion, and/ or buffering required for communication to and from the network 1526. The machine readable medium 1528 may provide instructions on which any of the methods disclosed herein may be performed. The instructions 1524 may provide source code and/or data code to the processor 1502 to enable any one or more operations disclosed herein.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method comprising the following steps of:
   (a) recording an audio visual asset using a predetermined script organized with at least one line break such that a user is prompted during the recording of a dialogue;
   (b) partitioning the audio visual asset into at least one audio visual segment such that a variable final message compilation is anticipated;
   (c) editing the at least one audio visual segment by applying at least one of a naming paradigm and a data tagging system such that the at least one audio visual segment is accessible by an audio visual data tag and exported to the variable final message compilation;
   (d) overlaying the at least one audio visual segment with at least one audio visual variable; and
   (e) compiling the at least one audio visual segment by uploading the at least one audio visual segment into a multimedia synthesis compiler such that the variable final message compilation is generated.

2. The method of claim 1 wherein the at least one line break associable with the predetermined script is defined to be aware of steps (a) through (e) of claim 1 upon occurrence of a multimedia synthesis instance.

3. The method of claim 1 wherein any change to steps (a) through (e) of claim 1 result in a corresponding adaptation of each individual step of at least one of a (a), (b), (c), (d), and (e) upon occurrence of a multimedia synthesis instance.

4. The method of claim 1 wherein the predetermined script is read over a recording session such that the dialogue is prompted to be aware of steps (a) through (e) of claim 1 upon occurrence of a multimedia synthesis instance.

5. The method of claim 1 wherein the dialogue is recorded based on reading of at least one word such that the variable final message compilation generated through the multimedia synthesis compiler is aware of steps (a) through (e) of claim 1 upon occurrence of a multimedia synthesis instance.

6. The method of claim 1 wherein the naming paradigm that is applied to the at least one audio visual segment is organized based on at least one of an owner label, a voice label, a message context label, a message context attribute label, a message product type label, and a file type label.

7. The method of claim 1 wherein the data tagging system that is applied to the at least one audio visual segment is applied based on a context with at least one variation selected from the group consisting of an output enabler, an output playback, a distribution channel and a pricing.

8. The method of claim 1 wherein the overlaying the at least one audio visual segment with the at least one audio visual variable is applied based on at least one of a message type, an audio type, a visual type, and a personalization.

9. The method of claim 1 wherein the recording of the audio visual asset using the predetermined script is performed using at least one of a microphone, an interactive voice response, and the user.

10. The method of claim 1 wherein the at least one audio visual segment is organized in a filing manner such that the at least one audio visual segment is aware of at least one other audio visual segment with respect to at least one of a voice, a message type, a message context, and multiple message types.

11. The method of claim 1 wherein the multimedia synthesis compiler compiles the variable final message compilation such that the variable final message compilation is outputted in at least one audio visual format.

12. The method of claim 1 wherein a plurality of audio visual assets are recorded using the predetermined script.

13. A communication system comprising:
   an audio visual asset recorded by a first user using a predetermined script to communicate with a second user;
   at least one audio visual segment created by partitioning the audio visual asset such that a variable final message compilation is anticipated;
   at least one of a naming paradigm and a data tagging system to tag the at least one audio visual segment such that the at least one audio visual segment is accessible via an audio visual data tag and is exported to the variable final message compilation;
   a multimedia synthesis compiler to compile the variable final message compilation upon uploading of the at least one audio visual segment into the multimedia synthesis compiler; and
   a message sent to the second user from the variable final message compilation based on the at least one audio visual segment.

14. The system of claim 13 wherein the recording of the audio visual asset using the predetermined script is performed using at least one of a microphone, an interactive voice response, and the first user.

15. The system of claim 13 wherein the multimedia synthesis compiler compiles the variable final message compilation such that the final message compilation is outputted in at least one audio visual segment.

16. The system of claim 13 wherein a plurality of audio visual assets are recorded using the predetermined script.

17. A communication method comprising:
   recording an audio visual asset using a predetermined script wherein the predetermined script is converted into a variable final message compilation associable with a plurality of users;
   partitioning the audio visual asset into at least one audio visual segment such that the variable final message compilation is anticipated;
   editing the at least one audio visual segment by applying at least one of a naming paradigm and a data tagging system such that the at least one audio visual segment is accessible via an audio visual data tag and is exported to the variable final message compilation;
   overlaying the at least one audio visual segment with at least one audio visual variable; and
   compiling the variable final message compilation by uploading the at least one audio visual segment into a multimedia synthesis compiler such that the variable final message compilation is generated.

18. The method of claim 17 wherein the recording of the audio visual asset using the predetermined script is performed using at least one of a microphone, an interactive voice response, and a person.

19. The method of claim 17 wherein the multimedia synthesis compiler compiles the variable final message compilation such that the final message compilation is outputted in at least one audio visual format.

20. The method of claim 17 wherein a plurality of audio visual assets are recorded using the predetermined script.

* * * * *